(12) United States Patent
Chen et al.

(10) Patent No.: US 11,256,067 B2
(45) Date of Patent: Feb. 22, 2022

(54) OPTICAL LENS

(71) Applicant: Rays Optics Inc., Hsinchu County (TW)

(72) Inventors: Hsin-Te Chen, Hsinchu County (TW); Ching-Sheng Chang, Hsinchu County (TW); Kuo-Chuan Wang, Hsinchu County (TW)

(73) Assignee: RAYS OPTICS INC., Hsinchu County (TW)

( * ) Notice: Subject to any disclaimer, the term of this patent is extended or adjusted under 35 U.S.C. 154(b) by 296 days.

(21) Appl. No.: 16/393,739

(22) Filed: Apr. 24, 2019

(65) Prior Publication Data

US 2019/0369363 A1 Dec. 5, 2019

(30) Foreign Application Priority Data

May 31, 2018 (TW) .................................. 107118817
Nov. 8, 2018 (TW) .................................. 107139657

(51) Int. Cl.
| | |
|---|---|
| *G02B 13/00* | (2006.01) |
| *G02B 9/62* | (2006.01) |
| *G02B 9/64* | (2006.01) |
| *G02B 7/04* | (2021.01) |
| *G02B 15/16* | (2006.01) |
| *G02B 27/64* | (2006.01) |

(52) U.S. Cl.
CPC ............. *G02B 13/002* (2013.01); *G02B 7/04* (2013.01); *G02B 9/62* (2013.01); *G02B 9/64* (2013.01); *G02B 13/006* (2013.01); *G02B 15/16* (2013.01); *G02B 27/64* (2013.01)

(58) Field of Classification Search
CPC ........ G02B 13/002; G02B 15/16; G02B 9/62; G02B 13/006; G02B 27/64; G02B 7/04; G02B 9/60; G02B 9/64; G02B 13/0045; G02B 13/18
USPC ......................................................... 359/754
See application file for complete search history.

(56) References Cited

U.S. PATENT DOCUMENTS

| | | |
|---|---|---|
| 5,835,286 A | 11/1998 | Yamanashi |
| 5,999,338 A | 12/1999 | Nagahara |
| 6,493,157 B1 | 12/2002 | Shinohara |
| 7,239,455 B2 | 7/2007 | Suzuki |
| 7,483,221 B2 | 1/2009 | Kitahara |
| 7,656,593 B2 | 2/2010 | Do |
| 8,248,714 B2 | 8/2012 | Huang et al. |

(Continued)

FOREIGN PATENT DOCUMENTS

| | | |
|---|---|---|
| TW | 556842 U | 10/2003 |
| TW | 559292 U | 10/2003 |

(Continued)

*Primary Examiner* — Marin Pichler
(74) *Attorney, Agent, or Firm* — Muncy, Geissler, Olds & Lowe, P.C.

(57) ABSTRACT

An optical lens includes a first lens group, a second lens group and an aperture stop disposed between the first lens group and the second lens group. The optical lens satisfies the conditions of 7 mm<D<25 mm and 0.3<D/LT<0.5, where D is a diameter of a lens surface of the second lens group furthest from the first lens group and LT is a total lens length measured along an optical axis between a lens surface of the first lens group furthest from the second lens group and the lens surface of the second lens group furthest from the first lens group.

17 Claims, 20 Drawing Sheets

(56) References Cited

U.S. PATENT DOCUMENTS

| | | |
|---|---|---|
| 8,254,033 B2 | 8/2012 | Huang et al. |
| 8,498,065 B2 | 7/2013 | Obama |
| 8,767,319 B2 | 7/2014 | Souma et al. |
| 8,934,182 B2 | 1/2015 | Obama |
| 9,405,095 B2 | 8/2016 | Baba et al. |
| 9,531,942 B2 | 12/2016 | Suzuki |
| 9,612,425 B2 | 4/2017 | Yonezawa |
| 9,720,209 B2 | 8/2017 | Kunugise et al. |
| 9,952,405 B2 | 4/2018 | Kondo |
| 2009/0034101 A1* | 2/2009 | Hsu ................ G02B 13/06 359/793 |
| 2014/0362455 A1 | 12/2014 | Sun et al. |
| 2015/0362699 A1* | 12/2015 | Nakanuma ........ G02B 13/04 348/360 |
| 2017/0090150 A1 | 3/2017 | Naruse et al. |
| 2017/0184815 A1 | 6/2017 | Wang et al. |
| 2017/0242222 A1 | 8/2017 | Aoi et al. |
| 2017/0307857 A1* | 10/2017 | Ning ................ G02B 9/62 |

FOREIGN PATENT DOCUMENTS

| | | |
|---|---|---|
| TW | 559293 U | 10/2003 |
| TW | I258597 B | 7/2006 |
| TW | 201533465 A | 9/2015 |
| TW | I525338 B | 3/2016 |
| TW | 201636672 A | 10/2016 |
| TW | I623773 B | 5/2018 |

\* cited by examiner

| field | Y(mm) | X |
|---|---|---|
| 0 | 0 | 100% |
| 0.1 | 0.515 | 99.50% |
| 0.2 | 1.03 | 97.20% |
| 0.3 | 1.545 | 93.60% |
| 0.4 | 2.06 | 88.30% |
| 0.5 | 2.575 | 83.30% |
| 0.6 | 3.09 | 77.60% |
| 0.7 | 3.605 | 71.50% |
| 0.8 | 4.12 | 65.50% |
| 0.9 | 4.635 | 59% |
| 1.0 | 5.15 | 52% |

| field | Y(mm) | X |
|---|---|---|
| 0 | 0 | 100% |
| 0.1 | 0.515 | 99.% |
| 0.2 | 1.03 | 94.70% |
| 0.3 | 1.545 | 89.60% |
| 0.4 | 2.06 | 83.80% |
| 0.5 | 2.575 | 77.90% |
| 0.6 | 3.09 | 72.60% |
| 0.7 | 3.605 | 66.40% |
| 0.8 | 4.12 | 58.90% |
| 0.9 | 4.635 | 51.60% |
| 1.0 | 5.15 | 43.40% |

| field | Y(mm) | X |
|---|---|---|
| 0 | 0 | 100% |
| 0.1 | 0.515 | 97% |
| 0.2 | 1.03 | 93% |
| 0.3 | 1.545 | 88.30% |
| 0.4 | 2.06 | 81.80% |
| 0.5 | 2.575 | 74.10% |
| 0.6 | 3.09 | 66.70% |
| 0.7 | 3.605 | 59.20% |
| 0.8 | 4.12 | 53% |
| 0.9 | 4.635 | 48% |
| 1.0 | 5 | 48% |

| field | Y(mm) | X |
|---|---|---|
| 0 | 0 | 100% |
| 0.1 | 0.515 | 99.8% |
| 0.2 | 1.03 | 99.2% |
| 0.3 | 1.545 | 98.3% |
| 0.4 | 2.06 | 96.9% |
| 0.5 | 2.575 | 94.9% |
| 0.6 | 3.09 | 92.1% |
| 0.7 | 3.605 | 88.3% |
| 0.8 | 4.12 | 82.8% |
| 0.9 | 4.635 | 75.4% |
| 1.0 | 5.15 | 67.1% |

| field | Y(mm) | X |
|---|---|---|
| 0 | 0 | 100% |
| 0.1 | 0.515 | 99.50% |
| 0.2 | 1.03 | 98.1% |
| 0.3 | 1.545 | 95.8% |
| 0.4 | 2.06 | 92.9% |
| 0.5 | 2.575 | 89.7% |
| 0.6 | 3.09 | 86.3% |
| 0.7 | 3.605 | 82.9% |
| 0.8 | 4.12 | 79.6% |
| 0.9 | 4.635 | 76.2% |
| 1.0 | 5.15 | 72.5% |

OPTICAL LENS

BACKGROUND OF THE INVENTION a. Field of the Invention

The invention relates to an optical lens.

b. Description of the Related Art

Recent advances in technology have led to the development of various types of optical lenses. For example, an automotive lens mounted on a vehicle is a commonly used optical lens. Nowadays, there is a growing need for an optical lens to become thinner and have high optical performance. To meet these requirements, the optical lens needs to have low fabrication costs, high resolution, large effective apertures, large target areas, wide ranges of operating temperatures and light weight. Therefore, it is desirable to provide an optical lens that may achieve lighter weight, lower fabrication costs, wider ranges of operating temperatures and better imaging quality.

BRIEF SUMMARY OF THE INVENTION

According to one aspect of the present disclosure, an optical lens includes a first lens group, a second lens group and an aperture stop. The first lens group includes at least two lenses with refractive powers, the second lens group has a positive refractive power and includes a doublet lens, and the aperture stop is disposed between the first lens group and the second lens group. A total number of lenses with refractive powers in the optical lens is more than four and less than eleven. The optical lens satisfies the conditions of 7 mm<D<25 mm and 0.3<D/LT<0.5, where D is a diameter of a lens surface of the second lens group furthest from the first lens group and LT is a total lens length measured along an optical axis between a lens surface of the first lens group furthest from the second lens group and the lens surface of the second lens group furthest from the first lens group. Accordingly, the optical lens may achieve good imaging quality, reduced fabrication costs, wider operating temperature ranges, lighter weight, miniaturization, and a reduced total lens number of 5-10.

According to another aspect of the present disclosure, an optical lens includes a first lens, a second lens, a compound lens having at least two lenses, and an aspheric lens arranged in order from a magnified side to a minified side. Adjoining surfaces of two adjacent lenses of the compound lens have a substantial identical radius of curvature, and a total number of lenses with refractive powers in the optical lens is more than four and less than eleven. The optical lens satisfies the conditions of LT/IMH25<12, and LT/IMH45<6.5, where LT is a total lens length measured along an optical axis between a lens surface of the first lens closest to the magnified-side and a lens surface of the aspheric lens closest to the minified-side, IMH25 is a semi-diagonal image height on an image plane measured at a half field of view of 25 degrees, and IMH 45 is a semi-diagonal image height on the image plane measured at a half field of view of 45 degrees. Accordingly, the optical lens may achieve good imaging quality, reduced fabrication costs, wider operating temperature ranges, lighter weight, miniaturization, and a reduced total lens number of 5-10.

According to another aspect of the present disclosure, an optical lens includes a first lens group and a second lens group. The first lens group includes a first lens and a second lens, and the second lens group with a positive refractive power includes an aspheric lens and a compound lens having at least two lenses. A ratio of a relative illumination measured at a highest position of an image height on an image plane to a relative illumination measured at a position of the optical axis on the image plane of the optical lens is larger than 35%. The optical lens satisfies the condition of 7 mm<D<25 mm, where D is a diameter of a lens surface of the second lens group furthest from the first lens group. Accordingly, the optical lens may achieve good imaging quality, reduced fabrication costs, wider operating temperature ranges, lighter weight, miniaturization, and a reduced total lens number of 5-10.

According to the above aspects, the optical lens may achieve good imaging quality, reduced fabrication costs and lighter weight and is favorable for miniaturization. Further, according to the above embodiments, the optical lens is allowed to operate at −40° C. to 105° C. and has a total lens number of 5 to 10. Therefore, the optical lens may achieve good imaging quality and resolution, lower fabrication costs, larger effective apertures, lighter weight and wide ranges of operating temperatures.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. Further, "First," "Second," etc, as used herein, are used as labels for nouns that they precede, and do not imply any type of ordering (e.g., spatial, temporal, logical, etc.).

The term "optical element" refers to an element made from at least in part a material that may refract, reflect, diffract, diffuse or filter at least a portion of the light passing through it. The material may include plastic or glass, and the optical element may be, for example, a lens, a prism or an aperture stop.

In an image-pickup system, a magnified side may refer to one side of an optical path of an optical lens comparatively near a subject to be picked-up, and a minified side may refer to other side of the optical path comparatively near a photosensor.

A certain region of an object side surface (or an image side surface) of a lens may be convex or concave. Herein, a convex or concave region is more outwardly convex or inwardly concave in the direction of an optical axis as compared with other neighboring regions of the object/image side surface.

Figure 1:
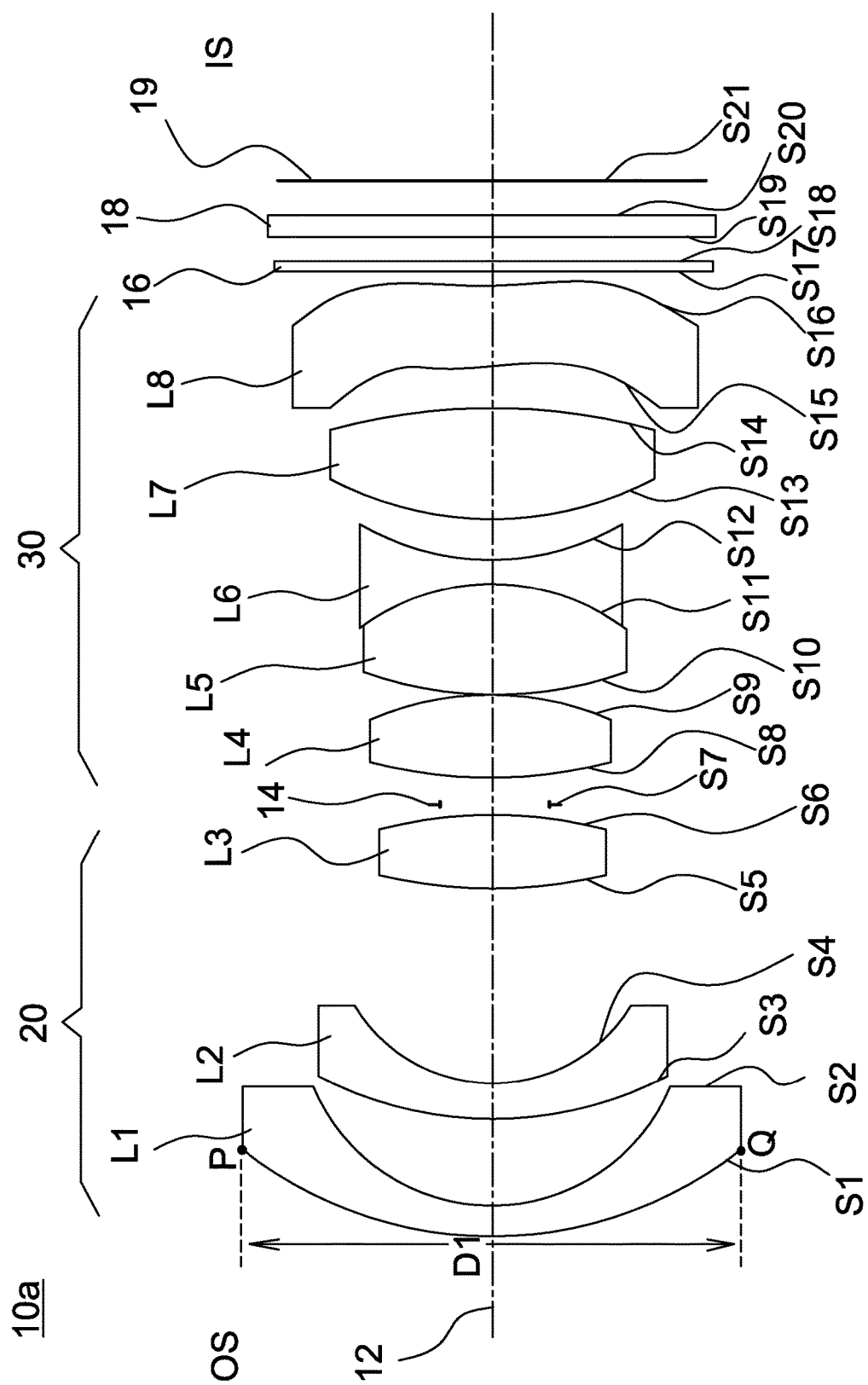
FIG. 1 shows a cross-sectional illustration of an optical lens according to an embodiment of the invention.
Figure 2:
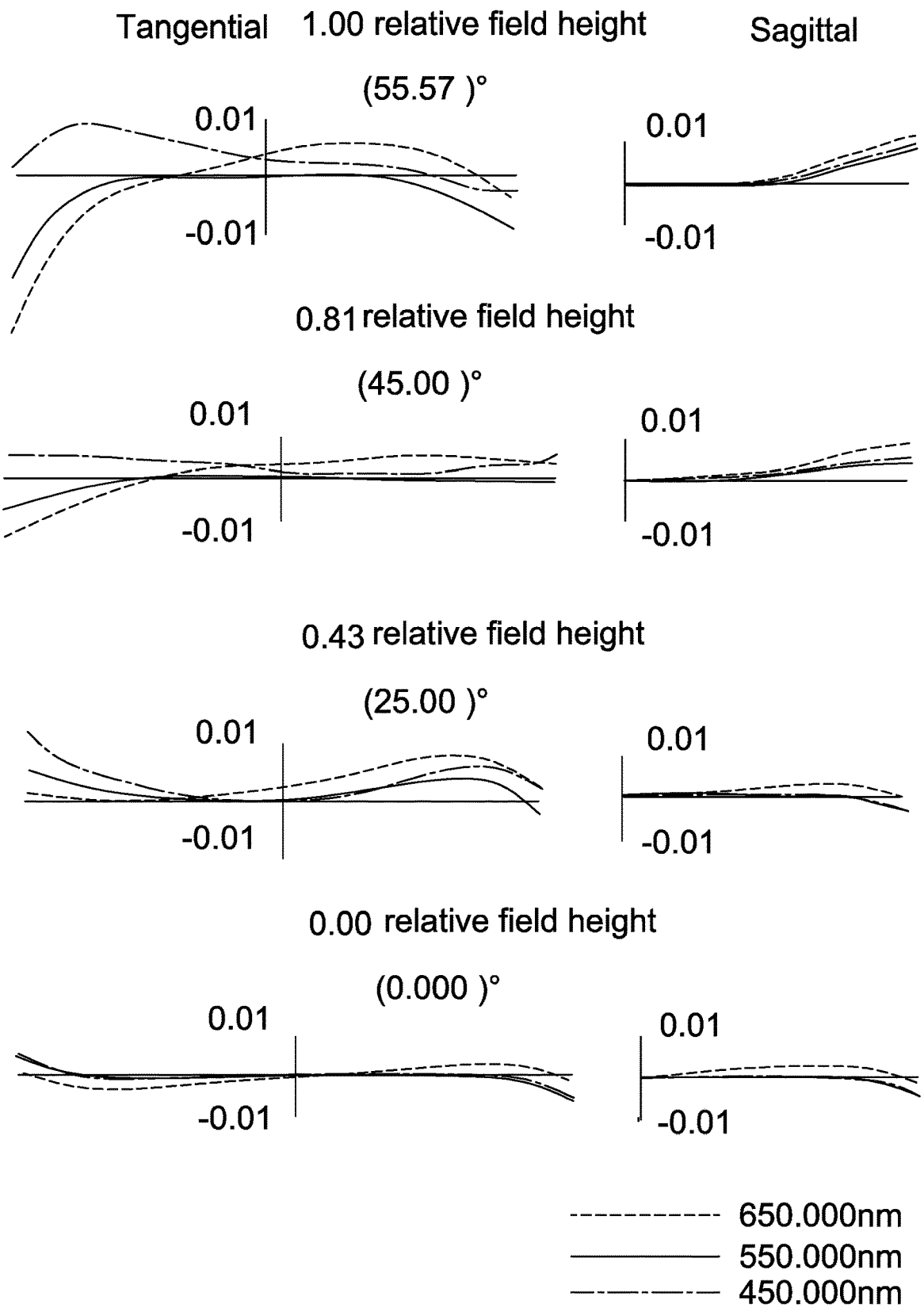
FIGS. 2-4 respectively show ray fan plots, MTF curves and a relative illumination curve and corresponding numerical values and ratios of relative illumination of the optical lens shown in FIG. 1.
Figure 3:
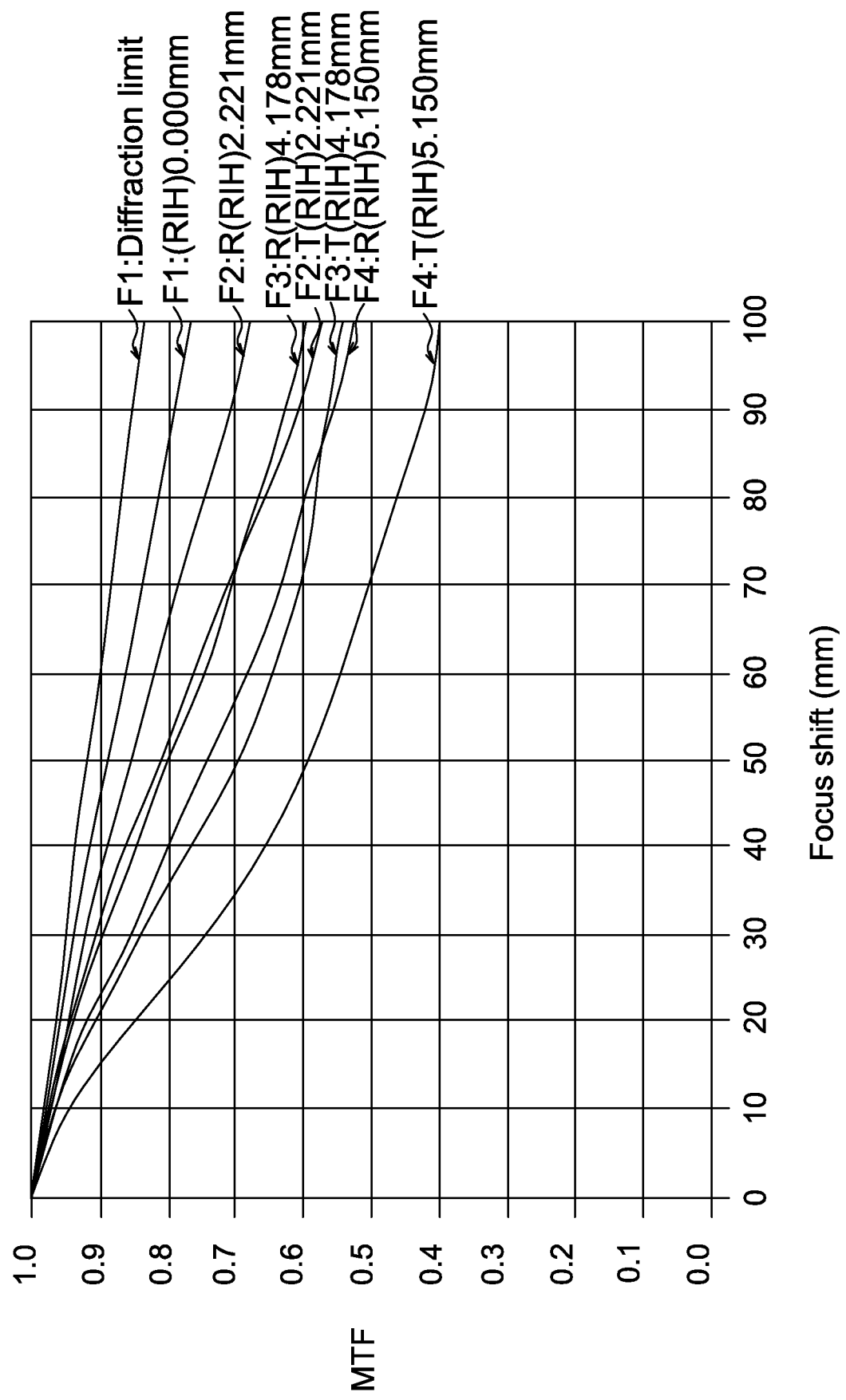
Figure 4:
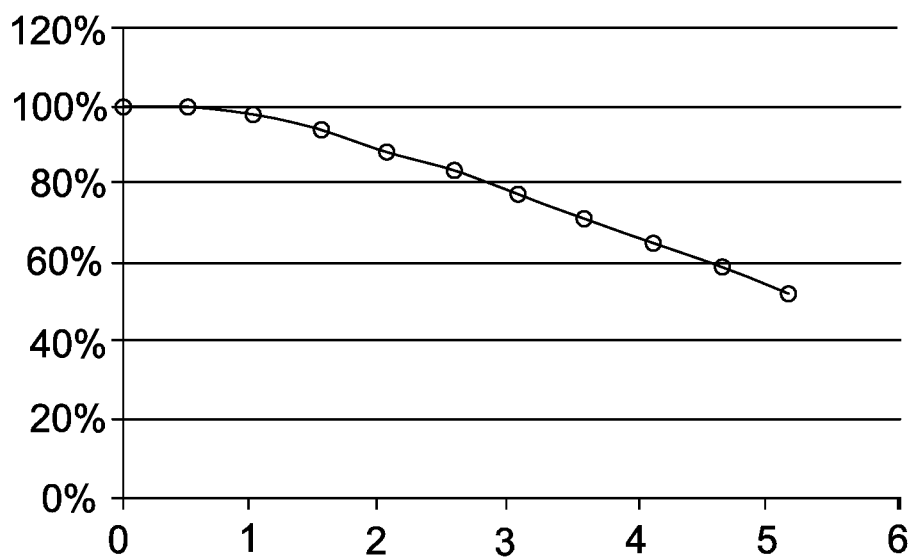

FIG. 1 shows a cross-sectional illustration of an optical lens according to an embodiment of the invention. As shown in FIG. 1, in this embodiment, the optical lens 10a has a lens barrel (not shown), and inside the lens barrel a first lens L1, a second lens L2, a third lens L3, an aperture stop 14, a fourth lens L4, a fifth lens L5, a sixth lens L6, a seventh lens L7 and a eighth lens L8 are arranged in order from a first side (magnified side OS) to a second side (minified side IS). The first lens L1, the second lens L2, and the third lens L3 form a first lens group 20 (such as a front lens group) with a positive refractive power, and the fourth lens L4, the fifth lens L5, the sixth lens L6, the seventh lens L7 and the eighth lens L8 form a second lens group 30 (such as a rear lens group) with a positive refractive power. Further, the minified side IS may be disposed with an IR (infrared) filter 16, a cover glass 18, and a photosensor (not shown), an image plane of the optical lens 10a formed at an effective focal length for visible light is labeled as 19, and the IR filter 16 and the cover glass 18 are disposed between the second lens group 30 and the image plane 19 for visible light. In this embodiment, the refractive powers of the first lens L1 to the eighth lens L8 are negative, negative, positive, positive, positive, negative, positive and negative, and the second lens L2 and the eighth lens L8 are aspheric glass lenses. In one embodiment, the aspheric glass lenses can be replaced with aspheric plastic lenses. In one embodiment, adjoining surfaces of two adjacent lenses may have an identical or a similar radius of curvature and are fit together to form a doublet lens or a triplet lens. For example, in this embodiment, the fifth lens L5 and the sixth lens L6 are fit together to form a doublet lens, but the invention is not limited thereto. In each of the following embodiments, the magnified side OS is located on the left side and the minified side IS is located on the right side of each figure, and thus this is not repeatedly described in the following for brevity.

The aperture stop 14 may be an independent component or integrally formed with other optical element. In this embodiment, the aperture stop 14 may use a mechanic piece to block out peripheral light and transmit central light to achieve aperture effects. The mechanic piece may be adjusted by varying its position, shape or transmittance. In other embodiments, the aperture stop 14 may be formed by applying an opaque or a light-absorbing material on a lens surface except for a central area to block out peripheral light and transmits central light.

A lens surface of each lens may be assigned a parameter of "diameter". For example, as shown in FIG. 1, a diameter D1 of a magnified-side surface S1 of the lens L is a distance between opposite turning points P and Q measured in a direction perpendicular to the optical axis 12. Further, in this embodiment, a diameter of the surface S1 is 11.99 mm, and a diameter of the surface S16 is 9.74 mm.

Detailed design parameters, shapes and aspheric coefficients of the optical lens 10a are shown in Table 1 and Table 2 below. In the following design examples of the invention, each aspheric surface satisfies the following equation:

$$Z = \frac{cr^2}{1 + \sqrt{1 - (1+k)c^2 r^2}} + Ar^4 + Br^6 + Cr^8 + Dr^{10} + Er^{12} + Fr^{14} + \ldots,$$

where Z denotes a sag of an aspheric surface along the optical axis, c denotes a reciprocal of a radius of an osculating sphere, k denotes a Conic constant, r denotes a height of the aspheric surface measured in a direction perpendicular to the optical axis 12, and A-F are aspheric coefficients of $4^{th}$, $6^{th}$, $8^{th}$, $10^{th}$, $12^{th}$ and $14^{th}$ orders. Table 2 lists aspheric coefficients and conic constant of each aspheric surface of the optical lens according to a first embodiment of the invention. Note the data provided below are not used for limiting the invention, and those skilled in the art may suitably modify parameters or settings of the following embodiment with reference of the invention without departing from the scope or spirit of the invention.

TABLE 1

F/# = 2.2; LT = 22.57 (mm)
FOV = 111.14 degrees; D/LT = 0.43
IMH25 = 2.22 (mm); IMH45 = 4.18 (mm)

| surface | radius of curvature (mm) | Interval (mm) | refractive index | Abbe number | object description |
|---|---|---|---|---|---|
| S1 | 10.12 | 0.70 | 1.58 | 59.37 | L1 (meniscus) |
| S2 | 4.66 | 2.06 | | | |
| S3* | 7.73 | 0.70 | 1.52 | 64.17 | L2 (aspheric) |
| S4* | 3.35 | 4.91 | | | |
| S5 | 45.73 | 1.49 | 1.87 | 40.73 | L3 (biconvex) |
| S6 | −12.11 | 0.32 | | | |
| S7 | INF. | 0.77 | | | aperture stop |
| S8 | 20.85 | 1.78 | 1.50 | 81.61 | L4 (biconvex) |
| S9 | −8.29 | 0.13 | | | |
| S10 | 11.41 | 2.53 | 1.59 | 67.00 | L5 (biconvex) |
| S11 | −4.99 | 0.67 | 1.69 | 31.08 | L6 (biconcave) |
| S12 | 6.98 | 1.07 | | | |
| S13 | 9.54 | 2.49 | 1.55 | 75.50 | L7 (biconvex) |
| S14 | −15.47 | 1.00 | | | |
| S15* | −1242.00 | 1.94 | 1.81 | 40.95 | L8 (aspheric) |
| S16* | 24.92 | 0.28 | | | |
| S17 | INF. | 0.21 | 1.52 | 64.17 | IR filter |
| S18 | INF. | 0.61 | | | |
| S19 | INF. | 0.50 | 1.52 | 64.17 | cover glass |
| S20 | INF. | 0.83 | | | |
| S21 | | | | | image plane |

TABLE 2

| | S3 | S4 | S15 | S16 |
|---|---|---|---|---|
| k | 7.281E−01 | −7.927E−01 | 0.000E+00 | 0.000E+00 |
| A | 9.498E−04 | 3.805E−03 | −3.570E−03 | −2.500E−03 |

TABLE 2-continued

| | S3 | S4 | S15 | S16 |
|---|---|---|---|---|
| B | −2.166E−04 | −1.880E−04 | −6.201E−05 | −2.719E−05 |
| C | 3.405E−06 | −8.739E−06 | 3.088E−06 | 1.490E−06 |
| D | 9.045E−08 | 5.507E−07 | −5.664E−08 | −3.063E−08 |
| E | −3.044E−09 | 5.046E−09 | −6.716E−09 | 0.000E+00 |
| F | −4.044E−12 | −2.461E−10 | 1.648E−10 | 0.000E+00 |

In the above Table 1, an interval of the surface S1 is a distance between the surface S1 and the surface S2 along the optical axis 12, an interval of the surface S2 is a distance between the surface S2 and the surface S3 along the optical axis 12, and an interval of the surface S20 is a distance between the surface S20 and the image plane 19 for visible light along the optical axis 12.

In the above table, the surface denoted by an asterisk is an aspheric surface, and a surface without the denotation of an asterisk is a spherical surface.

The radius of curvature is a reciprocal of the curvature. When a lens surface has a positive radius of curvature, the center of the lens surface is located towards the minified side. When a lens surface has a negative radius of curvature, the center of the lens surface is located towards the magnified side. The concavity and convexity of each lens surface is listed in the above table and shown in corresponding figures.

The Symbol F/# shown in the above table is an aperture value of the aperture stop. When the optical lens is used in an optical projection system, the image plane is provided on a light valve, and, when the optical lens is used in an image pick-up system, the image plane is a sensing surface of a photosensor.

When the optical lens is used in an image pick-up system, the image circle refers to a diagonal length of an image on an image plane, and a semi-diagonal image height equals half of the image circle.

A total lens length of the optical lens 10a is denoted as "LT" in the above table. Specifically, the total lens length LT is a distance along the optical axis 12 between a lens surface S1 closest to the magnified side (magnified-side surface of the lens L1) and a lens surface S16 closest to the minified side (minified-side surface of the lens L8). In one embodiment, the total lens length LT of the optical lens is smaller than 30 mm.

In this embodiment, FOV denoted in the above table is a light collection angle of the optical surface S1 closest to the magnified side; that is, the FOV is a full field of view measured diagonally.

In this embodiment, IMH25 denoted in the above table is a semi-diagonal image height on the image plane 19 measured at a half field of view of 25 degrees, and IMH 45 denoted in the above table is a semi-diagonal image height on the image plane 19 measured at a half field of view of 45 degrees.

In this embodiment, a ratio of an effective focal length of the optical lens to an effective focal length of the first lens group (front lens group) is 0.09, and a ratio of an effective focal length of the optical lens to an effective focal length of the second lens group (rear lens group) is 0.46.

In one embodiment, the optical lens may include two lens groups, and the front lens group may include two lenses with negative refractive powers, with one of the two lenses being an aspheric lens, to increase light collection efficiency, but the invention is not limited thereto. In one embodiment, an F-number of the optical lens is larger than or equal to 2.2. The rear lens group may include a compound lens (fit together by various ways such as cementing or pressing) and an aspheric lens to correct monochromatic and chromatic aberrations, and thus a minimum distance between two lenses of the rear lens group along an optical axis is smaller than 0.05 mm. The compound lens may be a doublet lens, a triplet lens or even higher number lens configurations. Adjoining surfaces of each two adjacent lenses of the doublet lens, triplet lens or even higher number lens configurations may have an identical or a similar radius of curvature. A total number of lenses with refractive power in the optical lens is 5 to 10 (more than four and less than eleven), and an entrance pupil diameter of the optical lens is greater than 2 mm, such as 2.23 mm in this embodiment. The optical lens may have two lenses with an Abbe number of greater than 65.

In one embodiment, the optical lens may satisfy a condition of 7 mm<D<25 mm, a further condition of 8 mm<D<20 mm, and a still further condition of 8.5 mm<D<15 mm, where D is a diameter of the lens surface closest to the image plane (a lens surface of the second lens group 30 furthest from the first lens group 20). Meeting the above conditions may facilitate light converging capability of lenses to reduce the scope of image beams passing through lenses to match the size of a photosensor and thus allow for better optical performance in a limited space.

In one embodiment, the optical lens may satisfy a condition of 0.3<D/LT<0.5, a further condition of 0.32<D/LT<0.48, and a still further condition of 0.35<D/LT<0.47, where D is a diameter of the lens surface closest to the image plane (a lens surface of the second lens group 30 furthest from the first lens group 20) and LT is a total lens length measured along the optical axis 12 between a magnified-side surface of a first lens (a lens surface of the first lens group 20 furthest from the second lens group 30) and a minified-side surface of a last lens (a lens surface of the second lens group 30 furthest from the first lens group 20). Note that this criterion allows for an optimized proportion of a photosensor to a total lens length; that is, providing a proportionally longer total lens length when using a larger photosensor and a proportionally shorter total lens length when using a smaller photosensor.

In one embodiment, the optical lens may satisfy a condition of LT/IMH25<12 and LT/IMH45<6.5, a further condition of LT/IMH25<11.8 and LT/IMH45<6.4, and a still further condition of LT/IMH25<11.6 and LT/IMH45<6.3, where LT is a total lens length measured along the optical axis 12 between a magnified-side surface of a first lens (a lens surface of the first lens group 20 furthest from the second lens group 30) and a minified-side surface of a last lens (a lens surface of the second lens group 30 furthest from the first lens group 20), IMH25 is a semi-diagonal image height on the image plane measured at a half field of view of 25 degrees, and IMH 45 is a semi-diagonal image height on the image plane measured at a half field of view of 45 degrees. Note that this criterion allows for an optimized proportion of a photosensor to a total lens length; that is, providing a proportionally longer total lens length when using a larger photosensor and a proportionally shorter total lens length when using a smaller photosensor.

Typically, the parameter of "relative illumination" is generally given as a percentage of illumination at any point on the sensor normalized to the position in the field with maximum illumination. In one embodiment, a ratio of the relative illumination measured at a highest position of an image height on the image plane to the relative illumination measured at a position of the optical axis on the image plane is larger than 35%. In another embodiment, the same ratio is larger than 38%, and, in a still further embodiment, the same ratio is larger than 40%.

Figure 5:
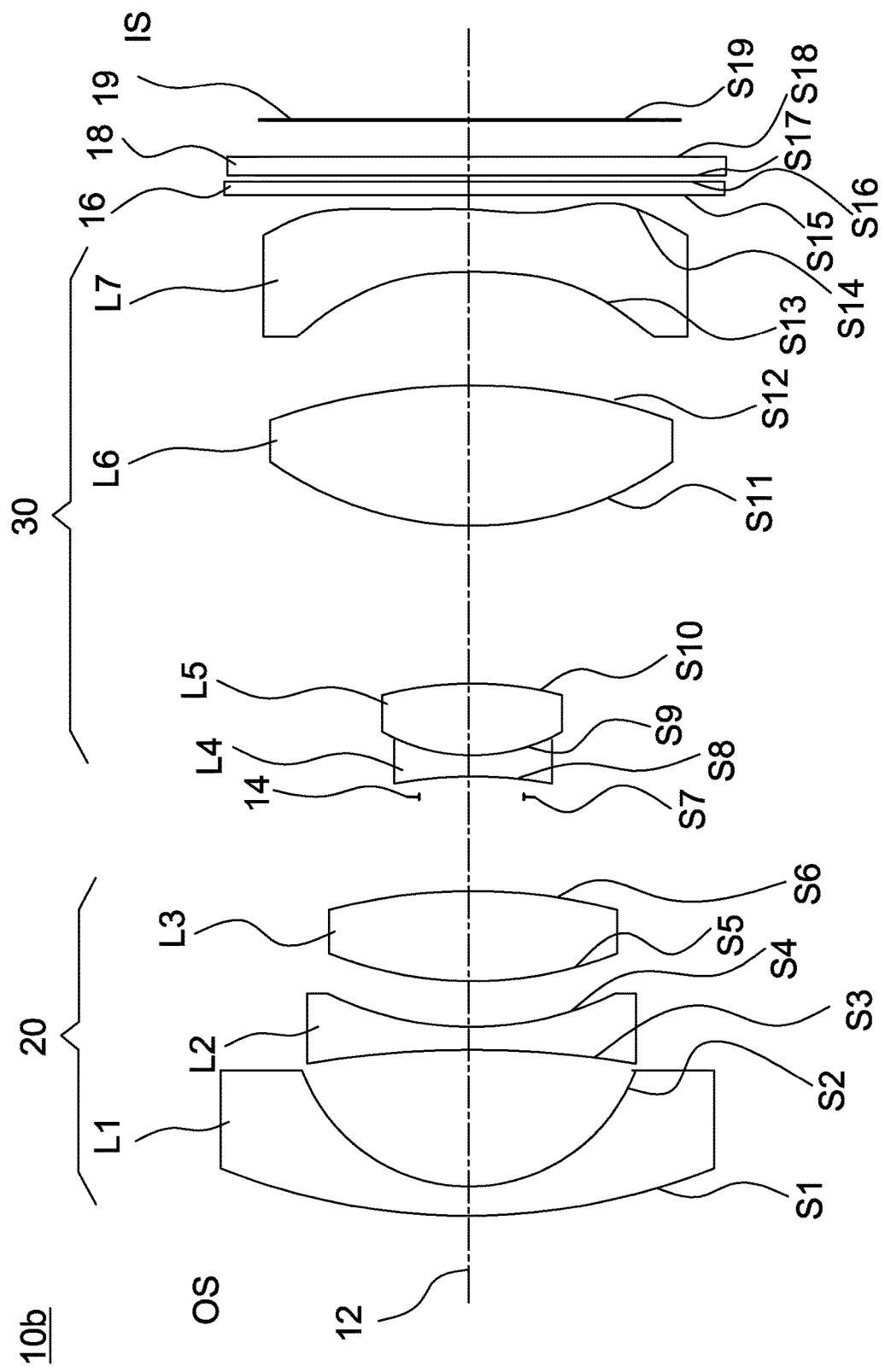
FIG. 5 shows a cross-sectional illustration of an optical lens according to another embodiment of the invention.
Figure 6:
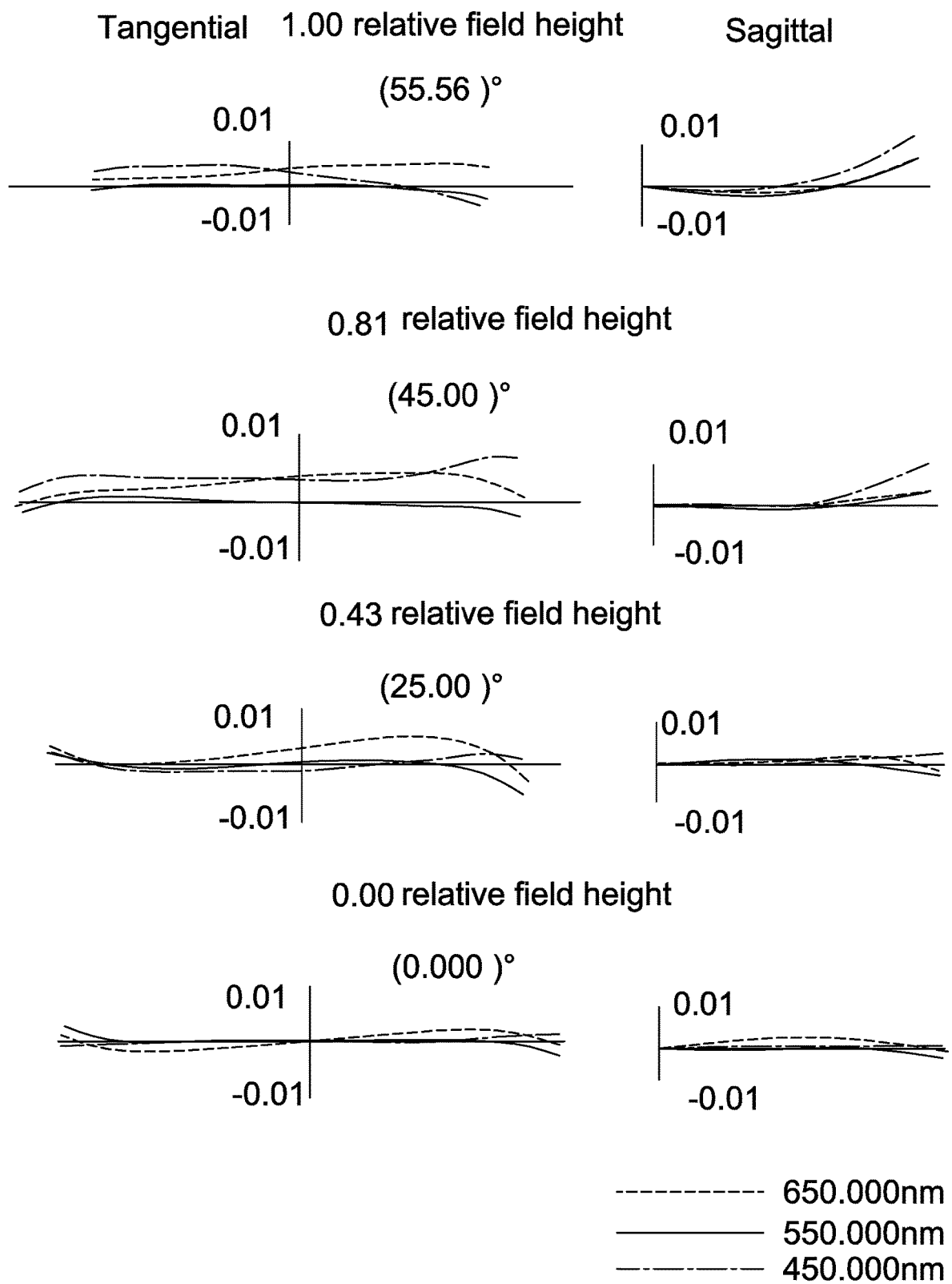
FIGS. 6-8 respectively show ray fan plots, MTF curves and a relative illumination curve and corresponding numerical values and ratios of relative illumination of the optical lens shown in FIG. 5.
Figure 7:
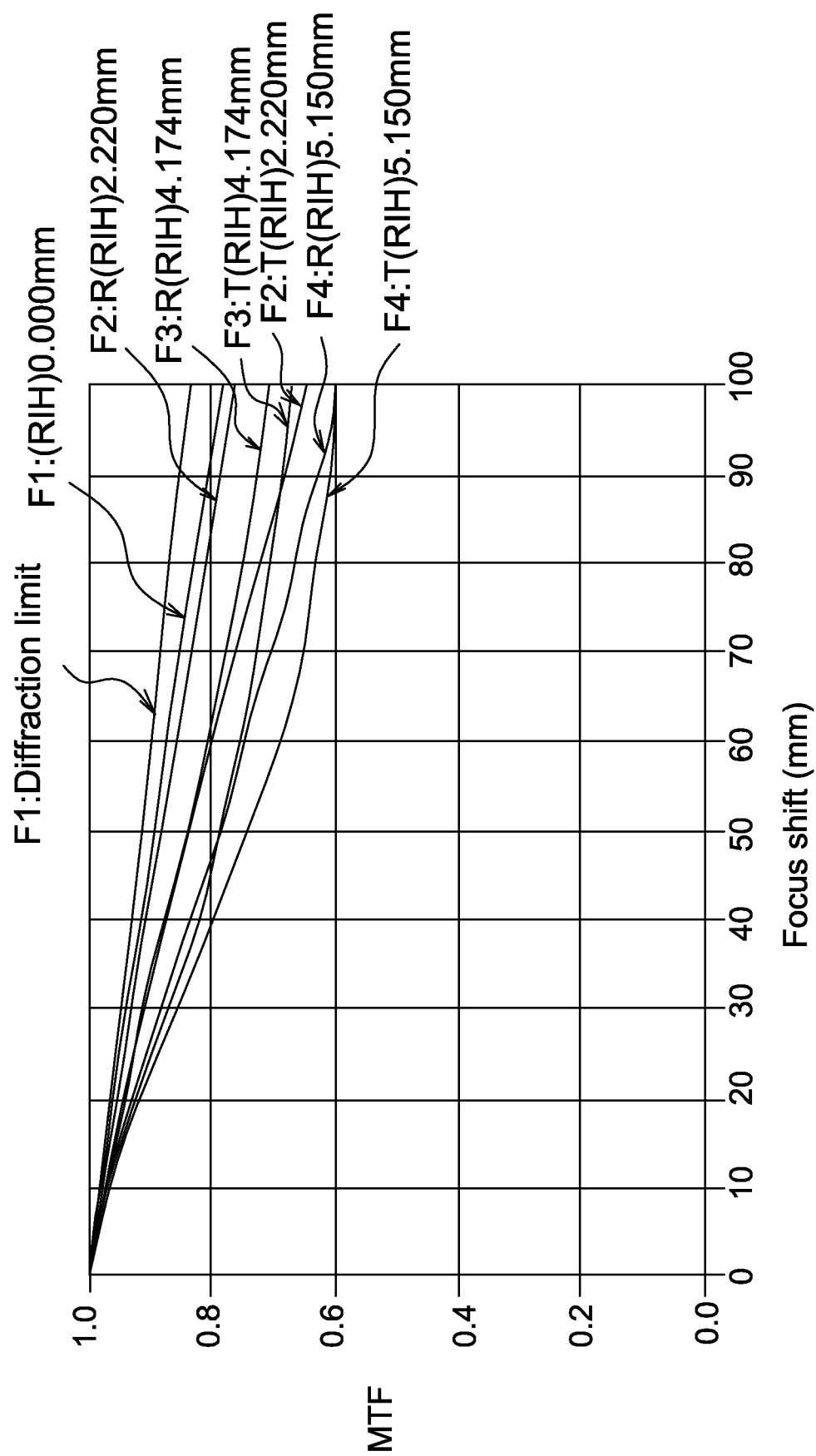
Figure 8:
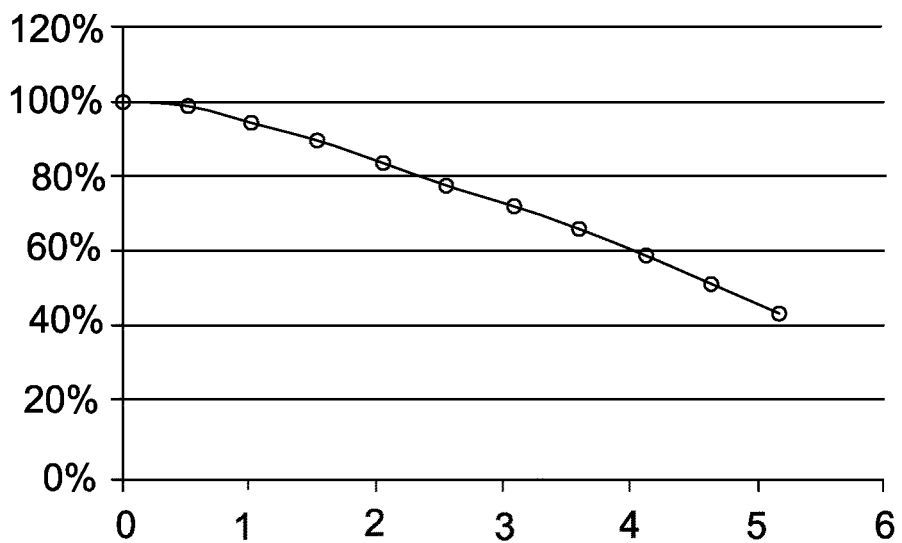

FIG. 5 shows a cross-sectional illustration of an optical lens 10b according to a second embodiment of the invention. In this embodiment, the refractive powers of the first lens L1 to the seventh lens L7 are negative, negative, positive, negative, positive, positive and negative, all the lenses L1-L7 are glass lenses, and the second lens L2 and the seventh lens L7 are aspheric lenses. In this embodiment, each aspheric lens is made from glass molding. In other embodiment, each aspheric lens may be made from plastic. Further, in this embodiment, the diameter of the surface S1 is 12 mm, and the diameter of the surface S14 is 10.23 mm. Detailed optical data and design parameters of the optical lens 10b are shown in Table 3 below.

TABLE 3

F/# = 2.2; LT = 22.91 (mm)
FOV = 111.12 degrees; D/LT = 0.45
IMH25 = 2.22 (mm); IMH45 = 4.17 (mm)

| surface | radius of curvature (mm) | interval (mm) | refractive index | Abbe number | object description |
|---|---|---|---|---|---|
| S1 | 16.03 | 0.65 | 1.57 | 67.12 | L1 (meniscus) |
| S2 | 4.38 | 2.97 | | | |
| S3* | −69.80 | 0.60 | 1.50 | 81.55 | L2 (aspheric) |
| S4* | 6.84 | 1.29 | | | |
| S5 | 13.38 | 1.83 | 1.89 | 31.90 | L3 (biconvex) |
| S6 | −15.20 | 2.27 | | | |
| S7 | INF. | 0.31 | | | aperture stop |
| S8 | −37.71 | 0.60 | 1.77 | 25.00 | L4 (biconcave) |
| S9 | 4.91 | 1.57 | 1.74 | 51.45 | L5 (biconvex) |
| S10 | −10.72 | 3.78 | | | |
| S11 | 9.48 | 3.12 | 1.70 | 55.54 | L6 (biconvex) |
| S12 | −14.94 | 2.30 | | | |
| S13* | 144.67 | 1.62 | 1.92 | 22.53 | L7 (aspheric) |
| S14* | 11.49 | 0.35 | | | |
| S15 | INF. | 0.21 | 1.52 | 64.17 | IR filter |
| S16 | INF. | 0.20 | | | |
| S17 | INF. | 0.50 | 1.52 | 64.17 | cover glass |
| S18 | INF. | 0.83 | | | |
| S19 | | | | | image plane |

Table 4 lists aspheric coefficients and conic constant of each aspheric surface of the optical lens according to the second embodiment of the invention.

TABLE 4

| | S3 | S4 | S13 | S14 |
|---|---|---|---|---|
| k | 0.000E+00 | 0.000E+00 | 0.000E+00 | 0.000E+00 |
| A | 1.310E−04 | 2.404E−04 | −4.175E−03 | −3.627E−03 |
| B | −5.333E−05 | −8.036E−05 | 7.788E−06 | 8.272E−05 |
| C | 1.967E−06 | 1.394E−06 | 2.045E−07 | −2.472E−06 |
| D | −3.797E−08 | −1.623E−08 | 5.899E−09 | 2.899E−08 |

In the above Table 3, an interval of the surface S1 is a distance between the surface S1 and the surface S2 along the optical axis 12, an interval of the surface S2 is a distance between the surface S2 and the surface S3 along the optical axis 12, and an interval of the surface S18 is a distance between the surface S18 and the image plane 19 for visible light along the optical axis 12. An entrance pupil diameter of the optical lens 10b is greater than 2 mm, such as 2.25 mm in this embodiment. The optical lens 10b may have two lenses with an Abbe number of greater than 65.

In this embodiment, a ratio of an effective focal length of the optical lens to an effective focal length of the first lens group (front lens group) is 0.02, and a ratio of an effective focal length of the optical lens to an effective focal length of the second lens group (rear lens group) is 0.6.

Figure 9:
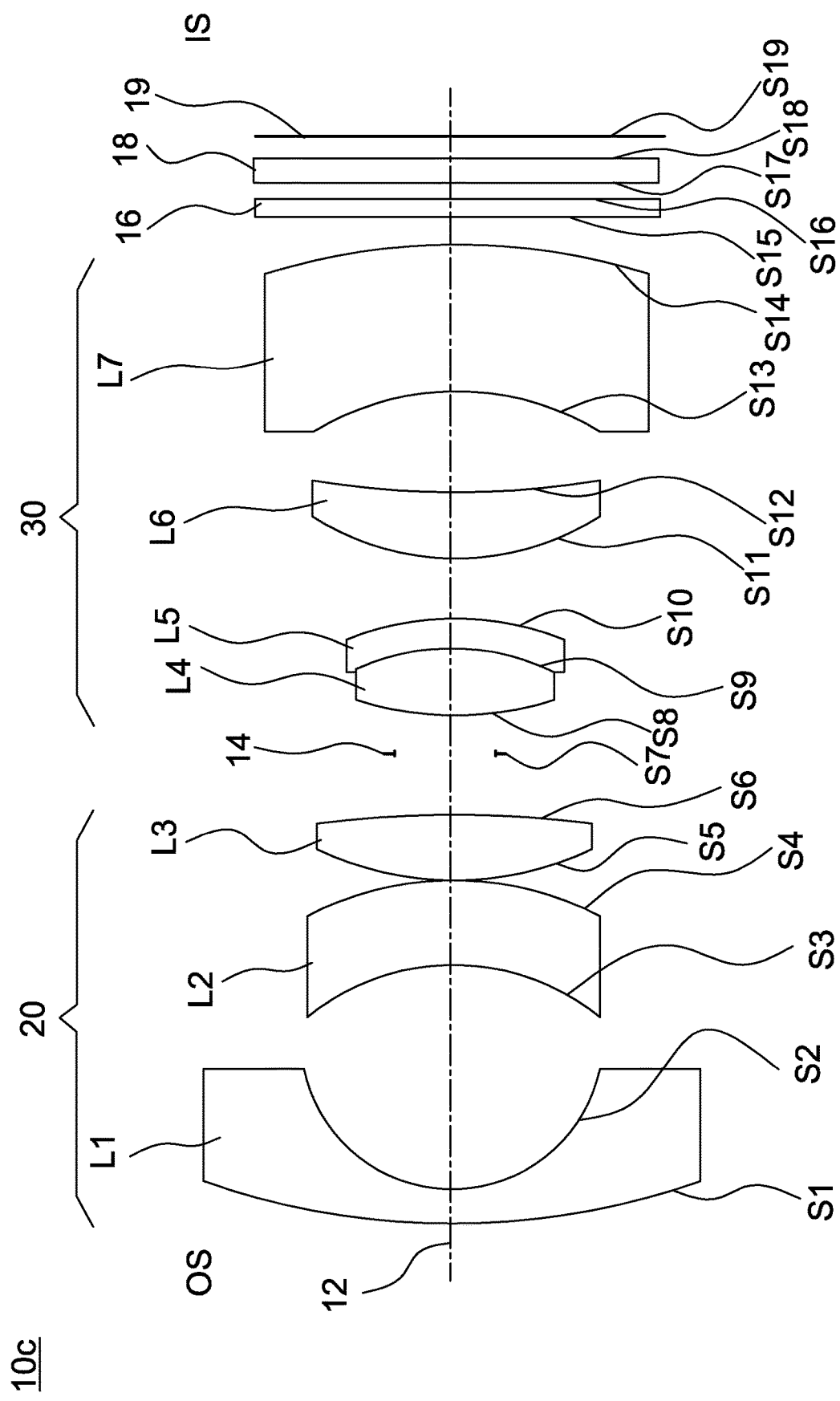
FIG. 9 shows a cross-sectional illustration of an optical lens according to another embodiment of the invention.
Figure 10:
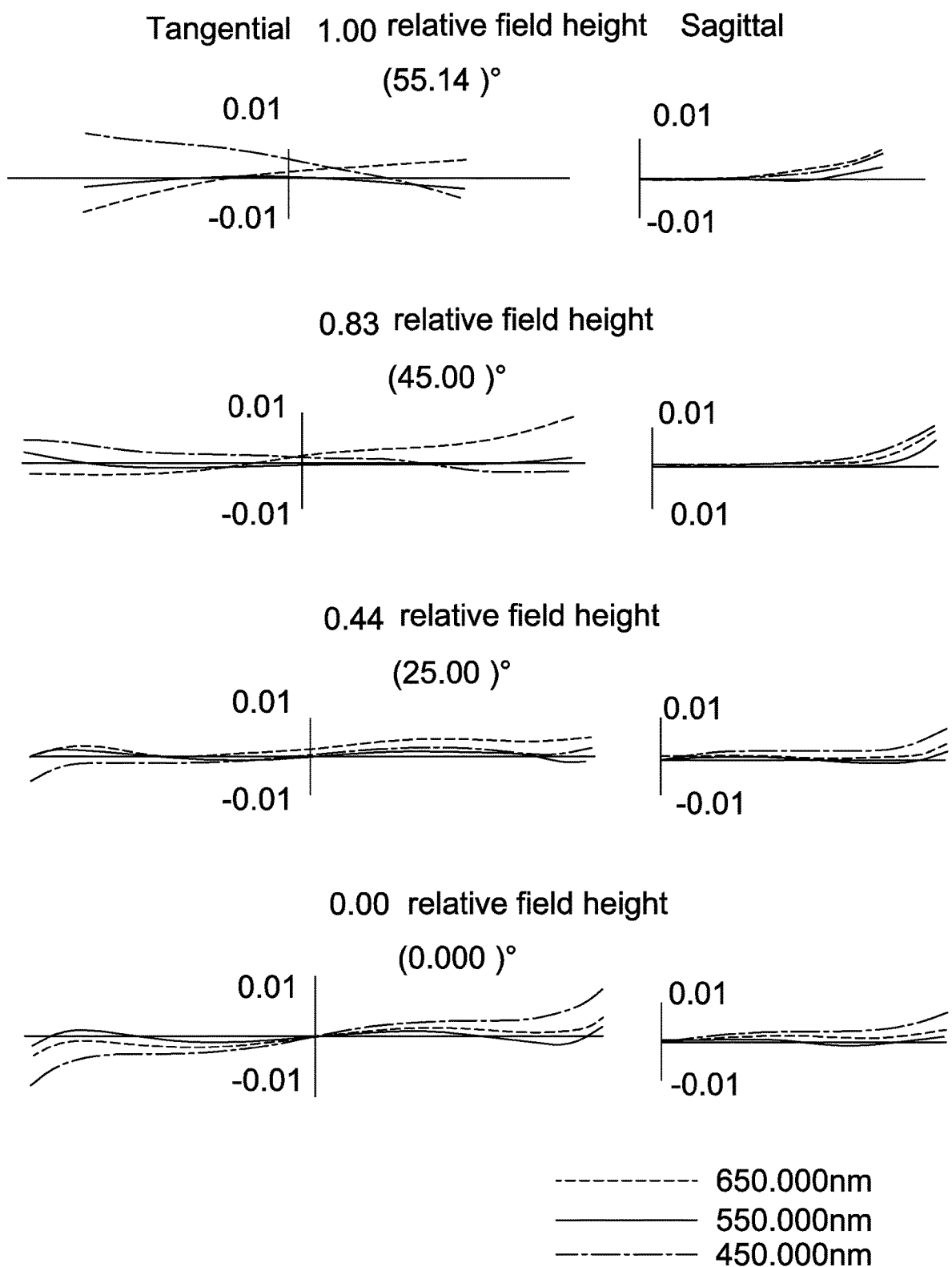
FIGS. 10-12 respectively show ray fan plots, MTF curves and a relative illumination curve and corresponding numerical values and ratios of relative illumination of the optical lens shown in FIG. 9.
Figure 11:
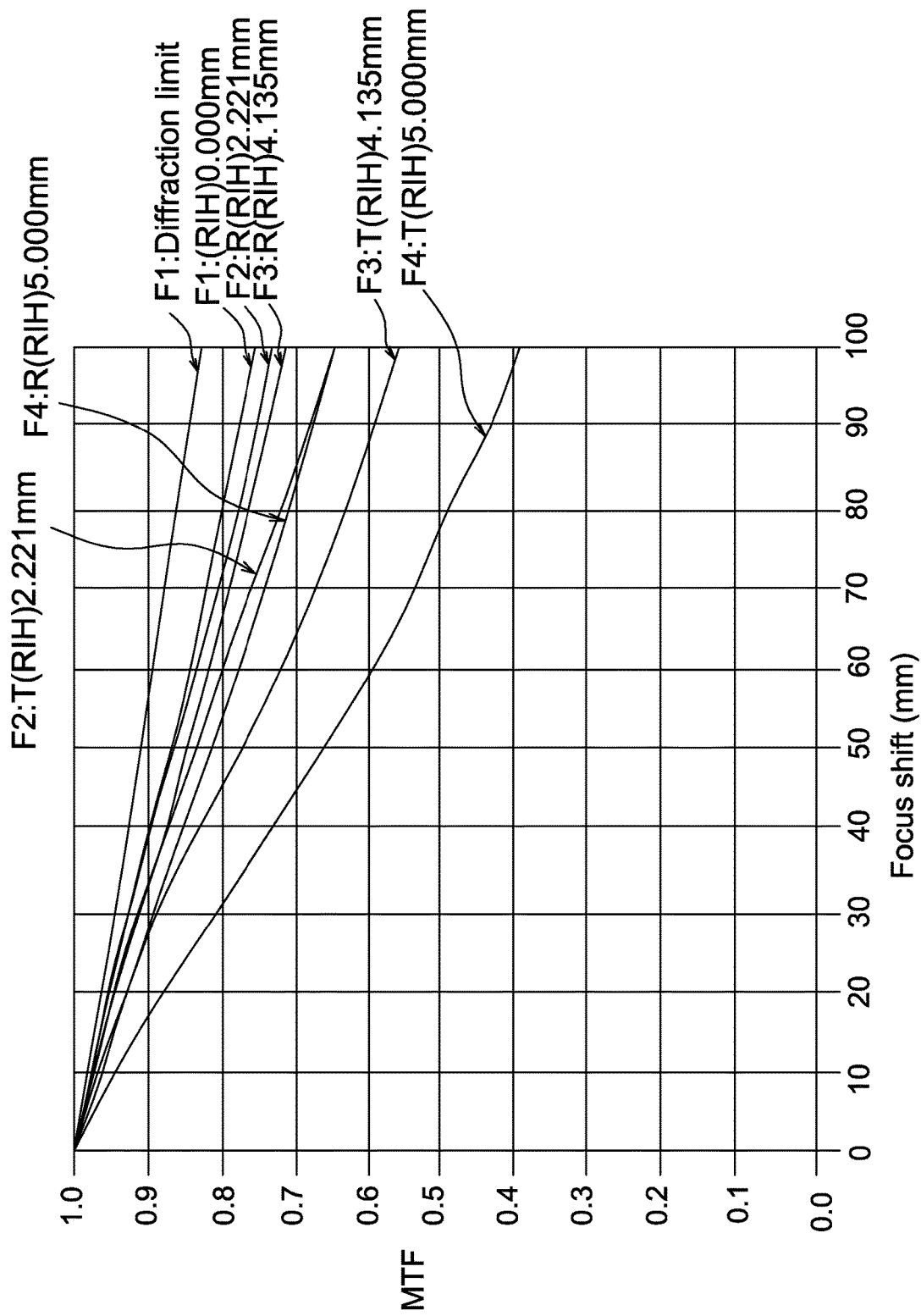
Figure 12:
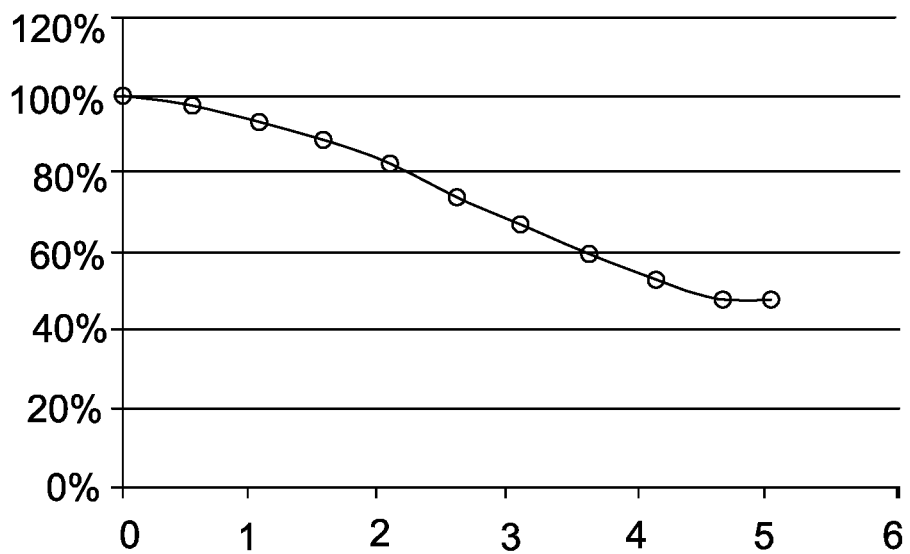

FIG. 9 shows a cross-sectional illustration of an optical lens 10c according to a third embodiment of the invention. In this embodiment, the refractive powers of the first lens L1 to the seventh lens L7 are negative, negative, positive, positive, negative, positive and negative, all the lenses L1-L7 are glass lenses, and the first lens L1 and the seventh lens L7 are aspheric lenses. In this embodiment, each aspheric lens is made from glass molding. In other embodiment, each aspheric lens may be made from plastic. Further, in this embodiment, the diameter of the surface S1 is 12.2 mm, and the diameter of the surface S14 is 9.38 mm. Detailed optical data and design parameters of the optical lens 10c are shown in Table 5 below.

TABLE 5

F/# = 2.38; LT = 22.63 (mm)
FOV = 110.28 degrees; D/LT = 0.41
IMH25 = 2.22 (mm); IMH45 = 4.14 (mm)

| surface | radius of curvature (mm) | interval (mm) | refractive index | Abbe number | object description |
|---|---|---|---|---|---|
| S1* | 19.02 | 0.70 | 1.52 | 64.17 | L1 (aspheric) |
| S2* | 3.39 | 5.25 | | | |
| S3 | −5.19 | 1.92 | 2.00 | 19.32 | L2 (meniscus) |
| S4 | −7.73 | 0.10 | | | |
| S5 | 8.68 | 1.24 | 1.85 | 30.05 | L3 (biconvex) |
| S6 | −86.91 | 1.84 | | | |
| S7 | INF. | 0.67 | | | aperture stop |
| S8 | 11.22 | 1.61 | 1.50 | 81.61 | L4 (biconvex) |
| S9 | −5.21 | 0.50 | 2.00 | 19.32 | L5 (meniscus) |
| S10 | −10.72 | 1.60 | | | |
| S11 | 6.77 | 1.59 | 1.50 | 81.61 | L6 (meniscus) |
| S12 | 36.79 | 2.12 | | | |
| S13* | −26.11 | 3.50 | 1.81 | 40.95 | L7 (aspheric) |
| S14* | 338.02 | 0.64 | | | |
| S15 | INF. | 0.30 | 1.52 | 64.17 | IR filter |
| S16 | INF. | 0.50 | | | |
| S17 | INF. | 0.50 | 1.52 | 64.17 | cover glass |
| S18 | INF. | 0.50 | | | |
| S19 | | | | | image plane |

Table 6 lists aspheric coefficients and conic constant of each aspheric surface of the optical lens according to the third embodiment of the invention.

TABLE 6

| | S1 | S2 | S13 | S14 |
|---|---|---|---|---|
| k | −3.482E+00 | −4.525E−01 | 0.000E+00 | 0.000E+00 |
| A | 0.000E+00 | 0.000E+00 | −3.557E−03 | −2.025E−03 |
| B | 0.000E+00 | 0.000E+00 | −3.027E−05 | 3.566E−05 |
| C | 0.000E+00 | 0.000E+00 | 1.425E−06 | −7.208E−07 |

In the above Table 5, an interval of the surface S1 is a distance between the surface S1 and the surface S2 along the optical axis 12, an interval of the surface S2 is a distance between the surface S2 and the surface S3 along the optical axis 12, and an interval of the surface S18 is a distance between the surface S18 and the image plane 19 for visible light along the optical axis 12. An entrance pupil diameter of the optical lens 10c is greater than 2 mm, such as 2.09 mm in this embodiment. The optical lens 10c may have two lenses with an Abbe number of greater than 65.

In this embodiment, a ratio of an effective focal length of the optical lens to an effective focal length of the first lens group (front lens group) is 0.26, and a ratio of an effective focal length of the optical lens to an effective focal length of the second lens group (rear lens group) is 0.39.

Figure 13:
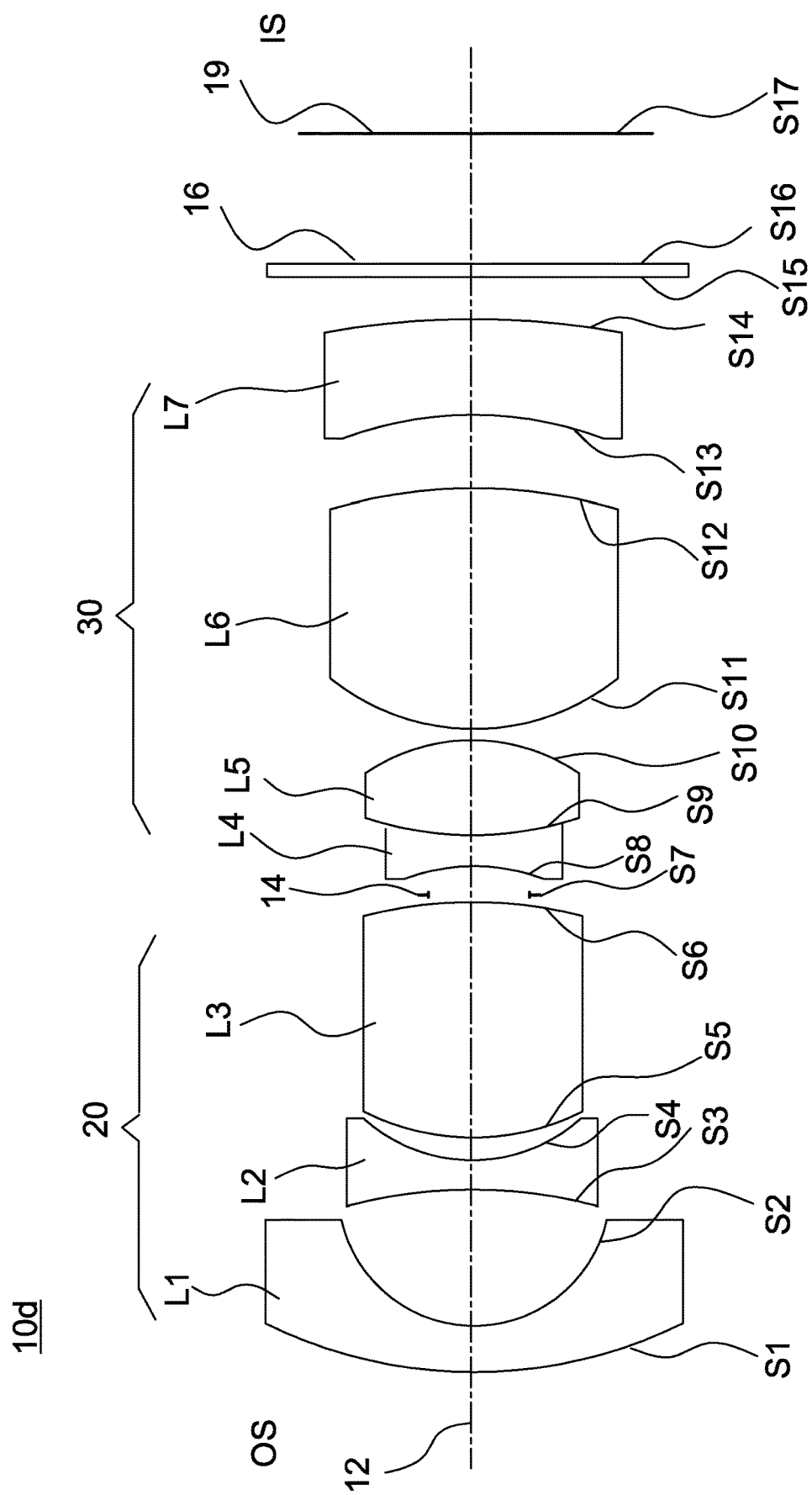
FIG. 13 shows a cross-sectional illustration of an optical lens according to another embodiment of the invention.
Figure 14:
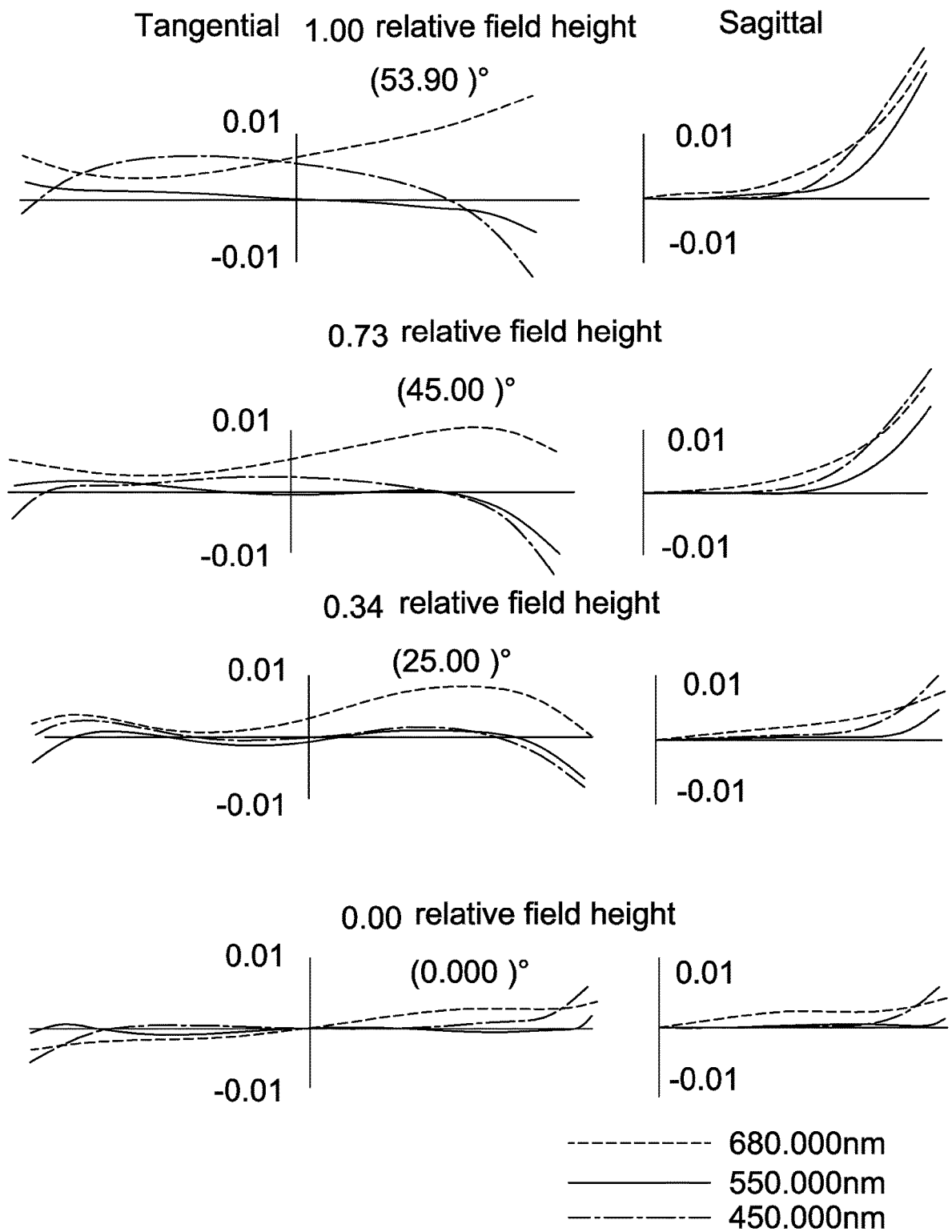
FIGS. 14-16 respectively show ray fan plots, MTF curves and a relative illumination curve and corresponding numerical values and ratios of relative illumination of the optical lens shown in FIG. 13.
Figure 15:
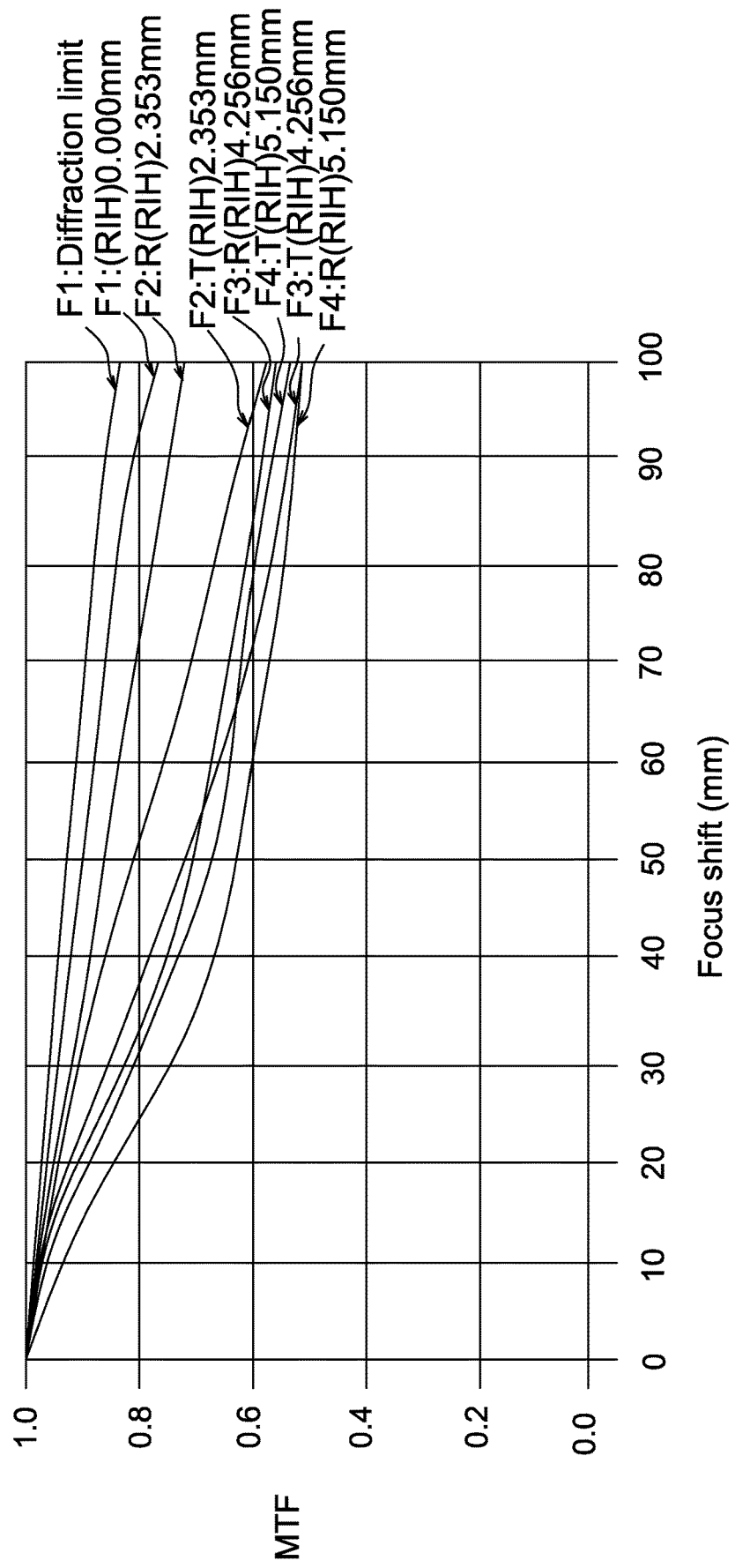
Figure 16:
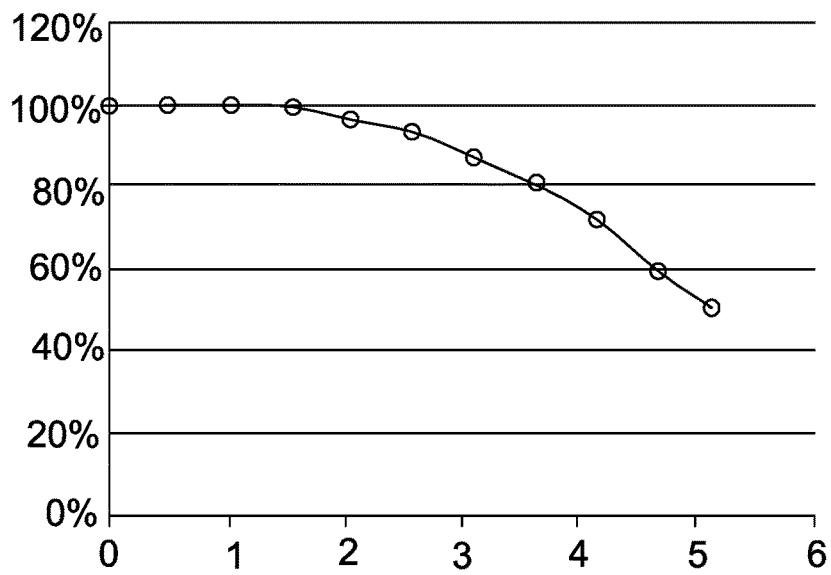

FIG. 13 shows a cross-sectional illustration of an optical lens 10d according to a fourth embodiment of the invention. In this embodiment, the refractive powers of the first lens L1 to the seventh lens L7 are negative, negative, positive, negative, positive, positive and negative, all the lenses L1-L7 are glass lenses, and the seventh lens L7 is an aspheric lens. In this embodiment, each aspheric lens is made from glass molding. In other embodiment, each aspheric lens may be made from plastic. In this embodiment, the cover glass is omitted from the optical lens 10d to reduce fabrication costs. Further, in this embodiment, the diameter of the surface S1 is 12.22 mm, and the diameter of the surface S14 is 8.67 mm. Detailed optical data and design parameters of the optical lens 10d are shown in Table 7 below.

TABLE 7

F/# = 2.2; LT = 24.56 (mm)
FOV = 107.79 degrees; D/LT = 0.35
IMH25 = 2.35 (mm); IMH45 = 4.26 (mm)

| surface | radius of curvature (mm) | interval (mm) | refractive index | Abbe number | object description |
|---|---|---|---|---|---|
| S1 | 17.72 | 1.01 | 1.49 | 70.42 | L1 (meniscus) |
| S2 | 4.25 | 3.26 | | | |
| S3 | −16.51 | 0.65 | 1.49 | 70.42 | L2 (biconcave) |
| S4 | 6.00 | 0.61 | | | |
| S5 | 9.32 | 5.45 | 2.00 | 29.13 | L3 (biconvex) |
| S6 | −18.85 | 0.10 | | | |
| S7 | INF. | 0.70 | | | aperture stop |
| S8 | −8.93 | 0.71 | 1.89 | 23.78 | L4 (biconcave) |
| S9 | 12.62 | 2.36 | 1.62 | 63.40 | L5 (biconvex) |
| S10 | −6.62 | 0.10 | | | |
| S11 | 7.87 | 5.64 | 1.59 | 68.62 | L6 (biconvex) |
| S12 | −18.77 | 1.80 | | | |
| S13* | −43.54 | 2.17 | 1.81 | 40.65 | L7 (aspheric) |
| S14* | −150.55 | 1.10 | | | |
| S15 | INF. | 0.21 | 1.52 | 64.17 | IR filter |
| S16 | INF. | 3.14 | | | |
| S17 | | | | | image plane |

Table 8 lists aspheric coefficients and conic constant of each aspheric surface of the optical lens according to the fourth embodiment of the invention.

TABLE 8

| | S13 | S14 |
|---|---|---|
| k | 0.000E+00 | 0.000E+00 |
| A | −1.748E−03 | −1.111E−03 |
| B | −2.132E−06 | 1.753E−05 |
| C | 8.625E−08 | 3.119E−07 |
| D | 0.000E+00 | 3.681E−09 |

In the above Table 7, an interval of the surface S1 is a distance between the surface S1 and the surface S2 along the optical axis 12, an interval of the surface S2 is a distance between the surface S2 and the surface S3 along the optical axis 12, and an interval of the surface S16 is a distance between the surface S16 and the image plane 19 for visible light along the optical axis 12. An entrance pupil diameter of the optical lens 10d is greater than 2 mm, such as 2.45 mm in this embodiment. The optical lens 10d may have two lenses with an Abbe number of greater than 65.

In this embodiment, a ratio of an effective focal length of the optical lens to an effective focal length of the first lens group (front lens group) is 0.08, and a ratio of an effective focal length of the optical lens to an effective focal length of the second lens group (rear lens group) is 0.58.

Figure 17:
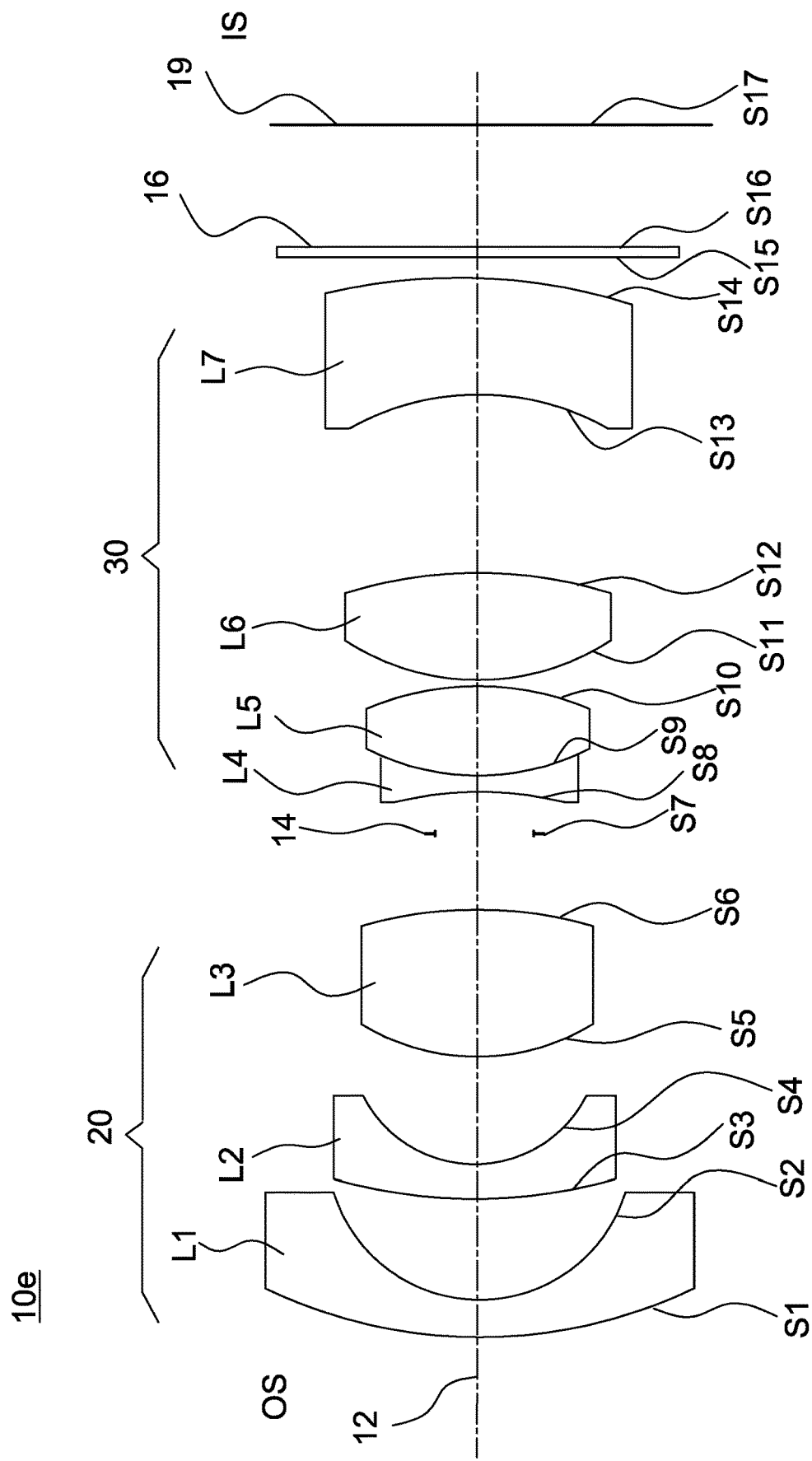
FIG. 17 shows a cross-sectional illustration of an optical lens according to another embodiment of the invention.
Figure 18:
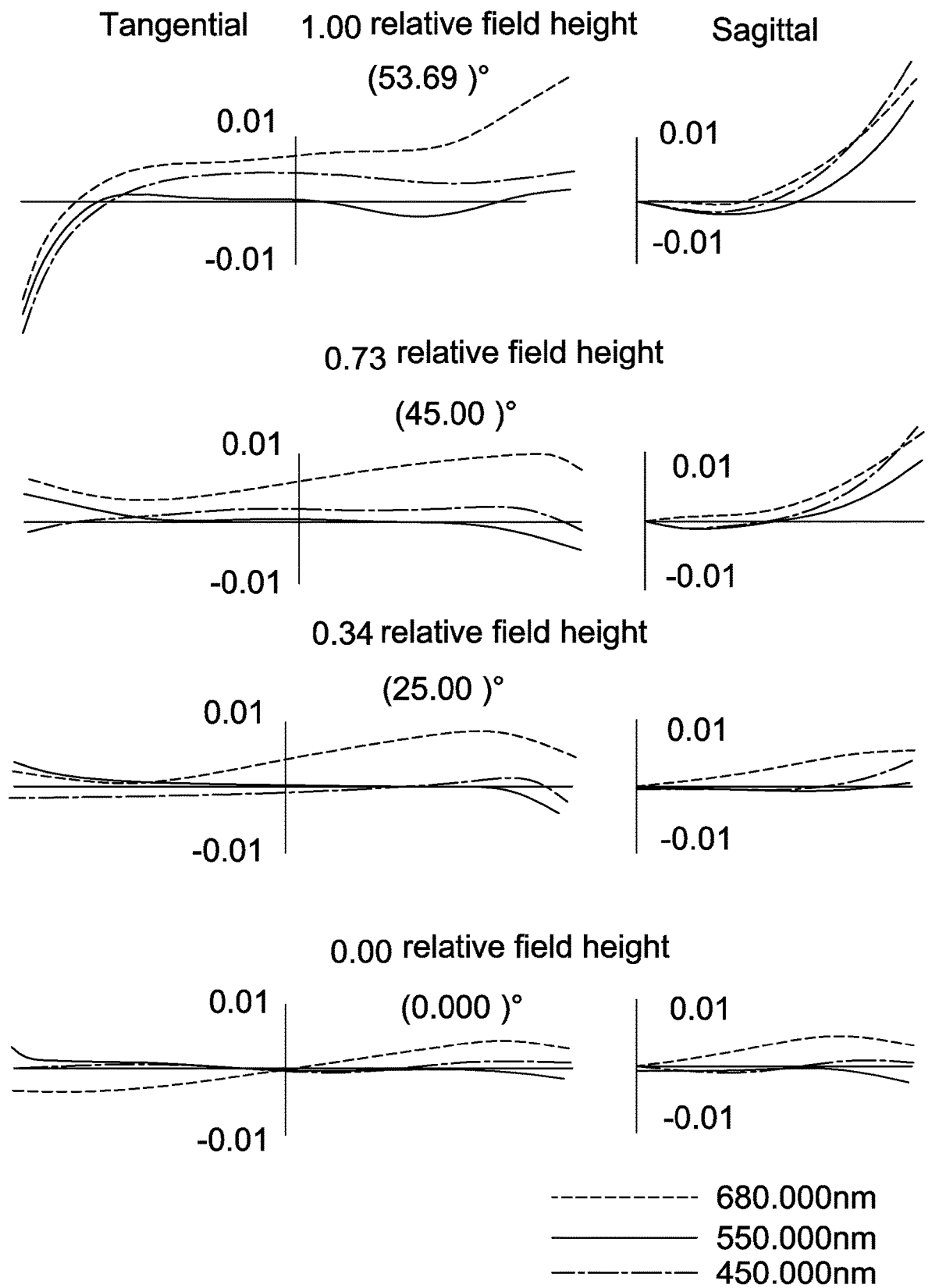
FIGS. 18-20 respectively show ray fan plots, MTF curves and a relative illumination curve and corresponding numerical values and ratios of relative illumination of the optical lens shown in FIG. 17.
Figure 19:
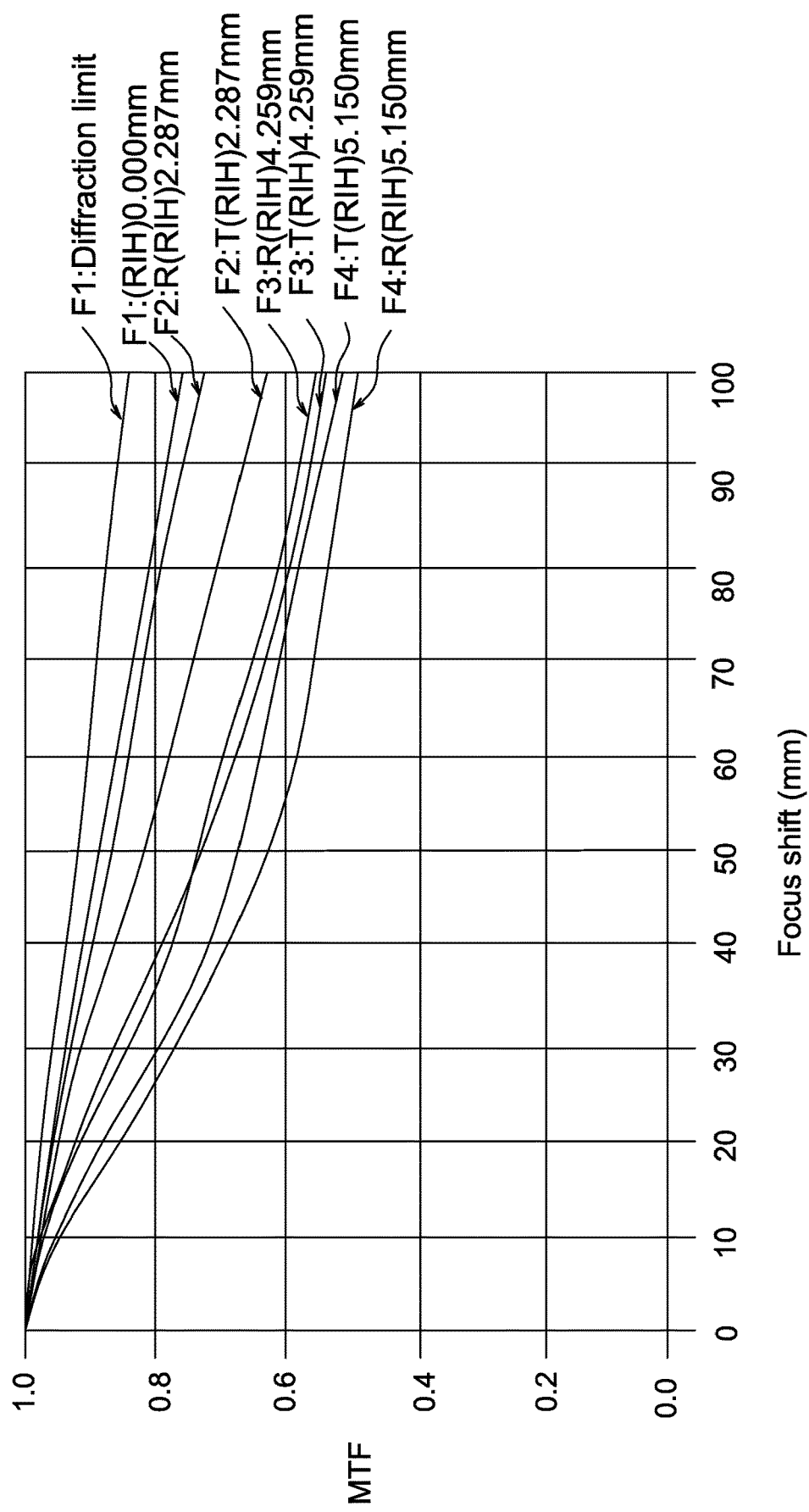
Figure 20:
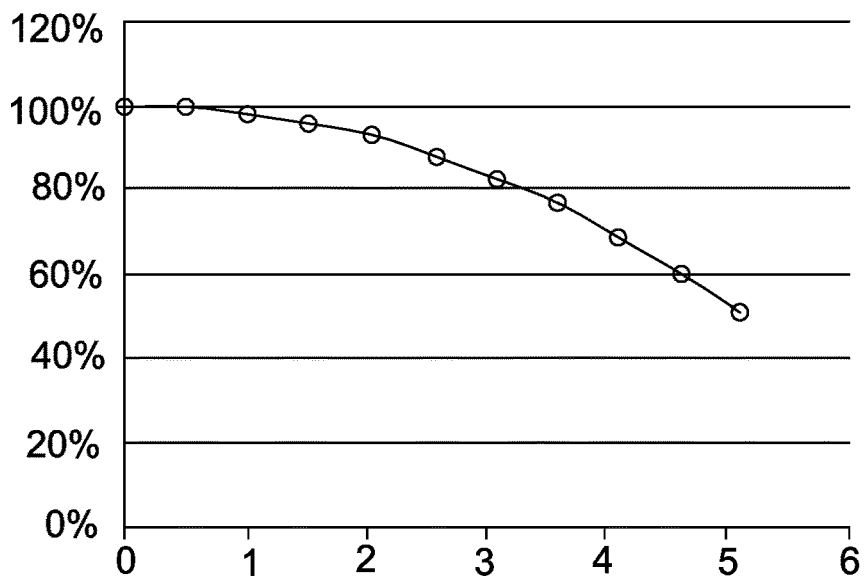

FIG. 17 shows a cross-sectional illustration of an optical lens 10e according to a fifth embodiment of the invention. In this embodiment, the refractive powers of the first lens L1 to the seventh lens L7 are negative, negative, positive, negative, positive, positive and negative, all the lenses L1-L7 are glass lenses, and the second lens L2 and the seventh lens L7 are aspheric lenses. In this embodiment, each aspheric lens is made from glass molding. In other embodiment, each aspheric lens may be made from plastic. The first lens L1, the second lens L2, and the third lens L3 form a first lens group 20 (such as a front lens group) with a negative refractive power, and the fourth lens L4, the fifth lens L5, the sixth lens L6 and the seventh lens L7 form a second lens group 30 (such as a rear lens group) with a positive refractive power. Further, in this embodiment, the diameter of the surface S1 is 13.6 mm, and the diameter of the surface S14 is 9.49 mm. Detailed optical data and design parameters of the optical lens 10e are shown in Table 9 below.

TABLE 9

F/# = 2.2; LT = 26.35 (mm)
FOV = 107.38 degrees; D/LT = 0.36
IMH25 = 2.29 (mm); IMH45 = 4.26 (mm)

| surface | radius of curvature (mm) | interval (mm) | refractive index | Abbe number | object description |
|---|---|---|---|---|---|
| S1 | 23.82 | 0.74 | 1.49 | 70.44 | L1 (meniscus) |
| S2 | 5.07 | 2.83 | | | |
| S3* | 22.87 | 0.81 | 1.51 | 64.03 | L2 (aspheric) |
| S4* | 4.72 | 2.78 | | | |
| S5 | 16.63 | 3.23 | 2.00 | 29.13 | L3 (biconvex) |
| S6 | −28.99 | 1.82 | | | |
| S7 | INF. | 1.08 | | | aperture stop |
| S8 | −44.13 | 0.71 | 1.92 | 20.88 | L4 (biconcave) |
| S9 | 9.99 | 2.21 | 1.72 | 47.92 | L5 (biconvex) |
| S10 | −10.40 | 0.10 | | | |
| S11 | 8.60 | 2.78 | 1.50 | 81.61 | L6 (biconvex) |
| S12 | −20.44 | 4.44 | | | |
| S13* | −43.75 | 2.83 | 1.81 | 40.65 | L7 (aspheric) |
| S14* | −150.60 | 0.61 | | | |
| S15 | INF. | 0.21 | 1.52 | 64.17 | IR filter |
| S16 | INF. | 1.83 | | | |
| S17 | | | | | image plane |

Table 10 lists aspheric coefficients and conic constant of each aspheric surface of the optical lens according to the fifth embodiment of the invention.

TABLE 10

| | S3 | S4 | S13 | S14 |
|---|---|---|---|---|
| k | 0.000E+00 | 0.000E+00 | 0.000E+00 | 0.000E+00 |
| A | −2.366E−04 | −5.678E−04 | −1.991E−03 | −9.608E−04 |
| B | −3.138E−05 | −7.104E−05 | −1.970E−05 | −1.672E−05 |
| C | 1.365E−06 | 7.803E−08 | −1.613E−06 | 5.141E−07 |
| D | −2.477E−08 | 4.014E−08 | 3.834E−08 | −3.066E−09 |
| E | 0.000E+00 | −5.243E−09 | 0.000E+00 | 0.000E+00 |

In the above Table 9, an interval of the surface S1 is a distance between the surface S1 and the surface S2 along the optical axis 12, an interval of the surface S2 is a distance between the surface S2 and the surface S3 along the optical axis 12, and an interval of the surface S16 is a distance between the surface S16 and the image plane 19 for visible light along the optical axis 12. An entrance pupil diameter of the optical lens 10e is greater than 2 mm, such as 2.33 mm in this embodiment. The optical lens may have two lenses with an Abbe number of greater than 65.

In this embodiment, a ratio of an effective focal length of the optical lens to an effective focal length of the first lens group (front lens group) is −0.06, and a ratio of an effective focal length of the optical lens to an effective focal length of the second lens group (rear lens group) is 0.55.

FIGS. 2-4, 6-8, 10-12, 14-16 and 18-20 respectively illustrate optical simulation results of the optical lenses 10a, 10b, 10c, 10d and 10e. FIGS. 2, 6, 10, 14 and 18 show ray fan plots for visible light of the optical lens 10a, 10b, 10c, 10d and 10e, respectively, where an abscissa of the plot represents entrance pupil positions, and an ordinate of the plot represents relative numerical values of positions on an image plane (such as the image plane S19) where main light beams are projected. FIGS. 3, 7, 11, 15 and 19 depict respective MTF curves of the optical lenses 10a, 10b, 10c, 10d and 10e. FIGS. 4, 8, 12, 16 and 20 depict respective relative illumination (RI) curves of the optical lenses 10a, 10b, 10c, 10d and 10e, where an image height on an image plane is divided into ten equal parts, and numerical values of relative illumination and ratios relative to the optical axis of each division point are shown in FIGS. 4, 8, 12, 16 and 20. The simulated results shown in FIGS. 2-4, 6-8, 10-12, 14-16 and 18-20 are within permitted ranges specified by the standard, which indicates the above embodiments of the optical lens 10a-10e may achieve good imaging quality.

According to the above embodiments, the optical lens may achieve good imaging quality, reduced fabrication costs and lighter weight and is favorable for miniaturization. Further, according to the above embodiments, the optical lens is allowed to operate at −40° C. to 105° C. and has a total lens number of 5 to 10. Therefore, the optical lens may achieve good imaging quality and resolution, lower fabrication costs, larger effective apertures, lighter weight and wide ranges of operating temperatures.

Though the embodiments of the invention and design parameters in the tables have been presented for purposes of illustration and description, they are not intended to be exhaustive or to limit the invention. Accordingly, many modifications and variations without departing from the spirit of the invention or essential characteristics thereof will be apparent to practitioners skilled in this art. It is intended that the scope of the invention be defined by the claims appended hereto and their equivalents in which all terms are meant in their broadest reasonable sense unless otherwise indicated.

What is claimed is:

1. An optical lens, comprising:
   a first lens group comprising at least two lenses with refractive powers;
   a second lens group with a positive refractive power and comprising a doublet lens; and
   an aperture stop disposed between the first lens group and the second lens group, wherein a total number of lenses with refractive powers in the optical lens is more than four and less than eleven, a full field of view of the optical lens is equal to or smaller than 111.14 degrees, and the optical lens satisfies the conditions:

$LT/IMH25<12$, $LT/IMH45<6.5$, $LT<30$ mm, 7 mm$<D<25$ mm and $0.3<D/LT<0.5$, where D is a diameter of a lens surface of the second lens group furthest from the first lens group, IMH25 is a semi-diagonal image height on an image plane measured at a half field of view of 25 degrees, and IMH 45 is a semi-diagonal image height on the image plane measured at a half field of view of 45 degrees, and LT is a total lens length measured along an optical axis between a lens surface of the first lens group furthest from the second lens group and the lens surface of the second lens group furthest from the first lens group.

2. The optical lens as claimed in claim 1, wherein at least two lenses of the optical lens have an Abbe number of greater than 65.

3. The optical lens as claimed in claim 1, wherein an F-number of the optical lens is larger than or equal to 2.2.

4. The optical lens as claimed in claim 1, wherein the first lens group of the optical lens comprises at least one aspheric lens, and the second lens group of the optical lens comprises only one aspheric lens.

5. The optical lens as claimed in claim 1, wherein all lenses of the optical lens are made from glass.

6. The optical lens as claimed in claim 1, wherein the optical lens satisfies one of the following conditions:
   (1) the optical lens comprises eight lenses having respective shapes of meniscus, aspheric, biconvex, biconvex, biconvex, biconcave, biconvex and aspheric in order from a magnified side to a minified side;
   (2) the optical lens comprises seven lenses having respective shapes of meniscus, aspheric, biconvex, biconcave, biconvex, biconvex and aspheric in order from the magnified side to the minified side;
   (3) the optical lens comprises seven lenses having respective shapes of aspheric, meniscus, biconvex, biconvex, meniscus, meniscus, and aspheric in order from the magnified side to the minified side;
   (4) the optical lens comprises seven lenses having respective shapes of meniscus, biconcave, biconvex, biconcave, biconvex, biconvex, and aspheric in order from the magnified side to the minified side.

7. The optical lens as claimed in claim 1, wherein a ratio of a relative illumination measured at a highest position of an image height on the image plane to a relative illumination measured at a position of the optical axis on the image plane of the optical lens is larger than 35%.

8. The optical lens as claimed in claim 7, wherein at least two lenses of the optical lens have an Abbe number of greater than 65.

9. The optical lens as claimed in claim 7, wherein an F-number of the optical lens is larger than or equal to 2.2.

10. The optical lens as claimed in claim 7, wherein the optical lens satisfies one of the following conditions:
    (1) the optical lens comprises eight lenses having respective shapes of meniscus, aspheric, biconvex, biconvex, biconvex, biconcave, biconvex and aspheric in order from a magnified side to a minified side;
    (2) the optical lens comprises seven lenses having respective shapes of meniscus, aspheric, biconvex, biconcave, biconvex, biconvex and aspheric in order from the magnified side to the minified side;
    (3) the optical lens comprises seven lenses having respective shapes of aspheric, meniscus, biconvex, biconvex, meniscus, meniscus, and aspheric in order from the magnified side to the minified side;
    (4) the optical lens comprises seven lenses having respective shapes of meniscus, biconcave, biconvex, biconcave, biconvex, biconvex, and aspheric in order from the magnified side to the minified side.

11. The optical lens as claimed in claim 7, wherein the optical lens satisfies one of the following conditions:

(1) the optical lens has eight lenses with refractive powers of negative, negative, positive, positive, positive, negative, positive and negative in order from a magnified side to a minified side;
(2) the optical lens has seven lenses with refractive powers of negative, negative, positive, negative, positive, positive and negative in order from the magnified side to the minified side;
(3) the optical lens has seven lenses with refractive powers of negative, negative, positive, positive, negative, positive and negative in order from the magnified side to the minified side.

12. An optical lens, comprising:
a first lens group comprising at least two lenses with refractive powers;
a second lens group with a positive refractive power and comprising a doublet lens; and
an aperture stop disposed between the first lens group and the second lens group, wherein a total number of lenses with refractive powers in the optical lens is more than four and less than eleven, a full field of view of the optical lens is equal to or smaller than 111.14 degrees, and the optical lens satisfies the conditions of LT<30 mm, 7 mm<D<25 mm and 0.3<D/LT<0.5, where D is a diameter of a lens surface of the second lens group furthest from the first lens group, and LT is a total lens length measured along an optical axis between a lens surface of the first lens group furthest from the second lens group and the lens surface of the second lens group furthest from the first lens group, and wherein the optical lens satisfies one of the following conditions:
(1) the optical lens has eight lenses with refractive powers of negative, negative, positive, positive, positive, negative, positive and negative in order from a magnified side to a minified side;
(2) the optical lens has seven lenses with refractive powers of negative, negative, positive, negative, positive, positive and negative in order from the magnified side to the minified side;
(3) the optical lens has seven lenses with refractive powers of negative, negative, positive, positive, negative, positive and negative in order from the magnified side to the minified side.

13. The optical lens as claimed in claim 12, wherein the optical lens satisfies the conditions:

$LT/IMH25<12$ and $LT/IMH45<6.5$, where IMH25 is a semi-diagonal image height on an image plane measured at a half field of view of 25 degrees, and IMH 45 is a semi-diagonal image height on the image plane measured at a half field of view of 45 degrees.

14. The optical lens as claimed in claim 12, wherein at least two lenses of the optical lens have an Abbe number of greater than 65.

15. The optical lens as claimed in claim 12, wherein an F-number of the optical lens is larger than or equal to 2.2.

16. The optical lens as claimed in claim 12, wherein all lenses of the optical lens are made from glass.

17. The optical lens as claimed in claim 12, wherein the optical lens satisfies one of the following conditions:
(1) the optical lens comprises eight lenses having respective shapes of meniscus, aspheric, biconvex, biconvex, biconvex, biconcave, biconvex and aspheric in order from the magnified side to the minified side;
(2) the optical lens comprises seven lenses having respective shapes of meniscus, aspheric, biconvex, biconcave, biconvex, biconvex and aspheric in order from the magnified side to the minified side;
(3) the optical lens comprises seven lenses having respective shapes of aspheric, meniscus, biconvex, biconvex, meniscus, meniscus, and aspheric in order from the magnified side to the minified side;
(4) the optical lens comprises seven lenses having respective shapes of meniscus, biconcave, biconvex, biconcave, biconvex, biconvex, and aspheric in order from the magnified side to the minified side.

* * * * *